United States Patent
Bowers et al.

(10) Patent No.: US 12,485,526 B2
(45) Date of Patent: Dec. 2, 2025

(54) GEAR CASE GRIP ACCESSORY FOR POWER TOOL

(71) Applicant: Black & Decker Inc., New Britain, CT (US)

(72) Inventors: Levi G. Bowers, Manchester, MD (US); Daniel F. Nace, Towson, MD (US); Eric S. Rohrer, Columbia, MD (US)

(73) Assignee: BLACK & DECKER INC., New Britain, CT (US)

( * ) Notice: Subject to any disclaimer, the term of this patent is extended or adjusted under 35 U.S.C. 154(b) by 24 days.

(21) Appl. No.: 18/120,747

(22) Filed: Mar. 13, 2023

(65) Prior Publication Data

US 2024/0308052 A1  Sep. 19, 2024

(51) Int. Cl.
| | |
|---|---|
| *B25F 5/00* | (2006.01) |
| *B24B 47/12* | (2006.01) |
| *B25F 5/02* | (2006.01) |
| *B24B 23/02* | (2006.01) |

(52) U.S. Cl.
CPC .............. *B25F 5/026* (2013.01); *B24B 47/12* (2013.01); *B25F 5/001* (2013.01); *B24B 23/028* (2013.01)

(58) Field of Classification Search
CPC .... B25F 5/02; B25F 5/001; B25F 3/00; B25F 5/026; B25F 5/00
USPC ......................................................... 173/217
See application file for complete search history.

(56) References Cited

U.S. PATENT DOCUMENTS

| | | | |
|---|---|---|---|
| 4,891,915 | A | 1/1990 | Yasuda |
| 5,558,570 | A | 9/1996 | Nakamura et al. |
| 6,511,200 | B2 | 1/2003 | Matsunaga |
| 6,799,643 | B2 | 10/2004 | Voulkidis et al. |
| 7,392,568 | B2 | 7/2008 | Koschel et al. |
| 7,418,892 | B2 | 9/2008 | Taylor |
| 7,628,219 | B2 | 12/2009 | Frauhammer et al. |
| 7,658,237 | B2 | 2/2010 | Rudolf et al. |
| 7,868,263 | B2 | 1/2011 | Hammerstingl et al. |
| 8,032,990 | B2 | 10/2011 | Shinma et al. |

(Continued)

FOREIGN PATENT DOCUMENTS

| | | |
|---|---|---|
| CN | 2825226 Y | 10/2006 |
| CN | 206296766 U | 7/2017 |

(Continued)

OTHER PUBLICATIONS

Extended European Search Report dated Nov. 9, 2022 in corresponding EP application No. 22177359.1, 6 pages.

(Continued)

*Primary Examiner* — Jacob A Smith
(74) *Attorney, Agent, or Firm* — Amir R. Rohani

(57) ABSTRACT

A power tool is provided including a housing, an electric motor disposed within the housing, a first trigger disposed on the housing, and a gear case mounted on an end of the housing. An accessory is provided that is mountable to the gear case and includes a second trigger pivotably secured relative to the gear case. The second trigger switch extends substantially along a surface of the gear case in a depressed position and being actuatable by a palm of an operator of the power tool. The supply of power from the power source to the electric motor is enabled only upon actuation of both the first trigger and the second trigger.

11 Claims, 22 Drawing Sheets

(56) References Cited

U.S. PATENT DOCUMENTS

| | | | |
|---|---|---|---|
| 8,186,018 B2 | 5/2012 | Martin | |
| 8,210,276 B2 | 7/2012 | Krondorfer et al. | |
| 8,240,395 B2 | 8/2012 | Kamegai et al. | |
| 10,682,753 B2 * | 6/2020 | Numata | H02K 7/145 |
| 11,260,502 B2 | 3/2022 | Schadow et al. | |
| 2008/0078067 A1 | 4/2008 | Nicolantonio et al. | |
| 2009/0038121 A1 | 2/2009 | Eicher et al. | |
| 2010/0089727 A1 | 4/2010 | Schmid | |
| 2012/0211250 A1 | 8/2012 | Yamauchi | |
| 2014/0102742 A1 * | 4/2014 | Eshleman | B25B 21/004 173/183 |
| 2014/0231113 A1 | 8/2014 | Steurer | |
| 2014/0326476 A1 | 11/2014 | Limberg et al. | |
| 2018/0117728 A1 * | 5/2018 | Kawakami | B25F 5/008 |
| 2018/0290285 A1 | 10/2018 | Sun | |
| 2018/0326554 A1 | 11/2018 | Schadow et al. | |
| 2019/0030622 A1 | 1/2019 | Carlson et al. | |
| 2020/0241086 A1 | 7/2020 | Thomas | |
| 2020/0384597 A1 * | 12/2020 | Numata | B25F 5/026 |
| 2020/0384627 A1 | 12/2020 | Numata | |
| 2021/0100170 A1 * | 4/2021 | Suzuki | A01G 3/053 |
| 2022/0388142 A1 | 12/2022 | Nace et al. | |

FOREIGN PATENT DOCUMENTS

| | | | | |
|---|---|---|---|---|
| CN | 208322987 U | | 1/2019 | |
| CN | 110228043 A | | 9/2019 | |
| CN | 210360762 U | | 4/2020 | |
| CN | 211305868 U | | 8/2020 | |
| CN | 113500505 A | | 10/2021 | |
| DE | 3634424 A1 | | 4/1988 | |
| DE | 4422245 A1 | | 1/1996 | |
| DE | 19507955 A1 | | 9/1996 | |
| DE | 102004007764 B3 | | 9/2005 | |
| DE | 202006011224 U1 * | | 11/2007 | B25B 21/00 |
| DE | 10117835 B4 | | 1/2008 | |
| DE | 202007012394 U1 | | 1/2008 | |
| DE | 102007059412 A1 | | 6/2009 | |
| DE | 102011089673 A1 | | 6/2013 | |
| DE | 102012208885 A1 | | 11/2013 | |
| DE | 102013213284 A1 | | 2/2014 | |
| DE | 202014105072 U1 | | 1/2015 | |
| DE | 202009019169 U1 | | 7/2017 | |
| DE | 202018102559 U1 | | 5/2018 | |
| DE | 102005063017 B4 | | 5/2019 | |
| DE | 102018108068 A1 | | 10/2019 | |
| DE | 102009002421 B4 | | 9/2021 | |
| EP | 1172181 A1 | | 1/2002 | |
| EP | 1504656 B1 | | 5/2006 | |
| EP | 1504657 B1 | | 9/2006 | |
| EP | 1504658 B1 | | 10/2006 | |
| EP | 1759813 A2 * | | 3/2007 | B27G 19/04 |
| EP | 1563962 B1 | | 5/2008 | |
| EP | 1952926 A2 | | 8/2008 | |
| EP | 1867443 B1 | | 7/2009 | |
| EP | 1400319 B1 | | 8/2009 | |
| EP | 2079630 B1 | | 3/2010 | |
| EP | 2237925 A1 | | 10/2010 | |
| EP | 1125698 B1 | | 6/2012 | |
| EP | 2641700 A1 | | 9/2013 | |
| EP | 2944430 B1 | | 9/2016 | |
| EP | 2732914 B1 | | 1/2017 | |
| EP | 2412483 B1 | | 2/2017 | |
| EP | 1889692 B1 | | 6/2017 | |
| EP | 2855097 B1 | | 8/2017 | |
| EP | 2371492 B1 | | 9/2017 | |
| EP | 3427899 A1 | | 1/2019 | |
| EP | 3348357 B1 | | 1/2020 | |
| EP | 3199017 B1 | | 5/2020 | |
| EP | 3663050 A1 | | 6/2020 | |
| EP | 2647473 B1 | | 7/2020 | |
| GB | 2444160 B | | 11/2009 | |
| GB | 2461992 B | | 8/2012 | |
| GB | 2598736 A | | 3/2022 | |
| JP | H08336779 A | | 12/1996 | |
| JP | 2006142425 A | | 6/2006 | |
| RU | 2544712 C2 | | 3/2015 | |
| WO | 2008009624 A1 | | 1/2008 | |
| WO | 2015025677 A1 | | 2/2015 | |
| WO | 2017051892 A1 | | 3/2017 | |
| WO | 2019136875 A1 | | 7/2019 | |
| WO | 2020241086 A1 | | 12/2020 | |
| WO | 2021192850 A1 | | 9/2021 | |

OTHER PUBLICATIONS

Extended European Search Report dated Nov. 8, 2022 in corresponding EP application No. 22177365.8, 6 pages.
Extended European Search Report dated Jul. 23, 2024 in corresponding EP application No. 24162430.3, 6 pages.

* cited by examiner

GEAR CASE GRIP ACCESSORY FOR POWER TOOL

FIELD OF THE DISCLOSURE

This disclosure relates to a gear case grip member for a power tool, and in particular to a mountable gear case grip accessory for a power tool such as a grinder designed to be operated by two hands for safety.

BACKGROUND

Various electric power tools are provided with handles for added user safety and stability. High power drills and hammer drills, for example, are provide with side handles including a clamping mechanism mounted around the transmission case to allow the user to operate the tool with two hands—one hand on the main handle of the tool engaging the trigger switch, and the second hand on the side handle to stabilize and apply added force to the tool. Metalworking power tools such as grinders similarly utilize side handles mounted on the tool.

Even when the side handle is mounted on the tool, the user may still opt to operate the tool without it. To address this issue, power tool designs have been provided that require the side handle to be mounted for the tool to operate. An example of such a design is described in US Patent Publication No. 2022/0388142, filed Jun. 6, 2022, which is incorporated herein by reference in its entirety. In this design, the side handle is provided with a threaded tip that is secured to a threaded side opening of the power tool. Further, the side handle includes an actuator that presses an actuation tip into another side opening of the power tool, which in turn allows flow of current from the power supply to the power tool. This arrangement ensures that the operator indeed holds the side handle, so the tool is operated by two hands for better control of the power tool and minimized risk of unintended injury.

For some applications, such as pipeline grinding and other metalworking applications where the operator has to apply the power tool in tight spaces, use of a side handle may not be practical. Therefore, a solution is needed to allow such operators to use power tools that are configured to work with a side handle reliable and effectively.

SUMMARY

According to an embodiment of the invention, an accessory for a power tool is provided including a cover mountable to a gear case of the power tool to substantially cover an outer surface of the gear case; and a trigger assembly pivotably secured to the cover and configured to selectively engage and activate a switch of the gear case.

In an embodiment, the cover includes a post and the trigger includes an opening configured to cooperate with the post to limit a travel distance of the trigger relative to the cover.

In an embodiment, the trigger assembly includes a trigger and an idler arm extending from a pivoting structure of the cover, the trigger is actuatable by a palm of an operator, and the idler arm is pivotably moveable in and out of engagement with the switch.

In an embodiment, the trigger assembly includes a spring disposed between the trigger and the cover to bias the trigger away from the switch.

In an embodiment, the trigger assembly includes a spring disposed between the idler arm and the trigger to bias the idler arm towards the switch.

In an embodiment, a second trigger assembly is pivotably secured to the cover and configured to engage and activate a second switch of the gear case, the switch and the second switch are disposed on opposite sides of the gear case, and the trigger assembly and the second trigger assembly are disposed on opposite sides of the cover.

In an embodiment, an activation of either the trigger assembly or the second trigger assembly is required for the power tool to be activated.

According to another embodiment, an accessory for a power tool includes a mount member being removably mountable to a gear case of the power tool; and a trigger pivotably secured to the mount member and configured to selectively engage and activate a switch of the gear case. The trigger extends substantially along a side surface of the gear case in a mounted and depressed position and being actuatable by a palm of an operator of the power tool.

In an embodiment, the power tool includes a threaded opening on a side of the gear case, and the mount member includes an opening configured to receive a fastener secured to the threaded opening.

In an embodiment, a pin projects from the trigger in the direction of the gear case, the power tool includes an opening on a side of the gear case in which the switch is located, and the pin is configured to selectively contact the switch when the trigger is pressed.

In an embodiment, the mount member includes an opening through which the pin is received, and a spring is arranged to bias the pin away from the mount member in the direction of the trigger.

According to an embodiment, a power tool is provided including a housing; a power supply interface disposed at an end of the housing and configured to receive electric power from a power source; an electric motor disposed within the housing; a first trigger disposed on the housing; a gear case mounted on an end of the housing opposite the power supply interface; and an accessory mountable to the gear case. The accessory includes a second trigger pivotably secured relative to the gear case, the second trigger switch extending substantially along a surface of the gear case in a depressed position and being actuatable by a palm of an operator of the power tool. The supply of power from the power source to the electric motor is enabled only upon actuation of both the first trigger and the second trigger.

In an embodiment, the gear case includes a switch, and the second trigger is configured to engage and activate the switch in a depressed position.

In an embodiment, the accessory includes a third trigger pivotably secured relative to the gear case opposite the second switch, the third trigger switch extending substantially along a side surface of the gear case in the depressed position and actuatable by the palm of the operator of the power tool.

In an embodiment, the accessory includes a cover mountable to the gear case, and the second trigger is pivotably secured to the cover.

In an embodiment, the cover includes a post and the second trigger includes an opening configured to cooperate with the post to limit a travel distance of the second trigger relative to the cover.

In an embodiment, the accessory includes an idler arm extending from a pivoting structure of the cover, the idler arm being pivotably moveable in and out of engagement a switch of the gear case with actuation of the second trigger.

In an embodiment, the accessory includes a mount member removably mounted to the gear case of the power tool, and the second trigger is pivotably secured to the mount member.

BRIEF DESCRIPTION OF THE DRAWINGS

The drawings described herein are for illustrative purposes only of selected embodiments and not all possible implementations and are not intended to limit the scope of the present disclosure.

Corresponding reference numerals indicate corresponding parts throughout the several figures of the drawings.

DETAILED DESCRIPTION

Figure 1:
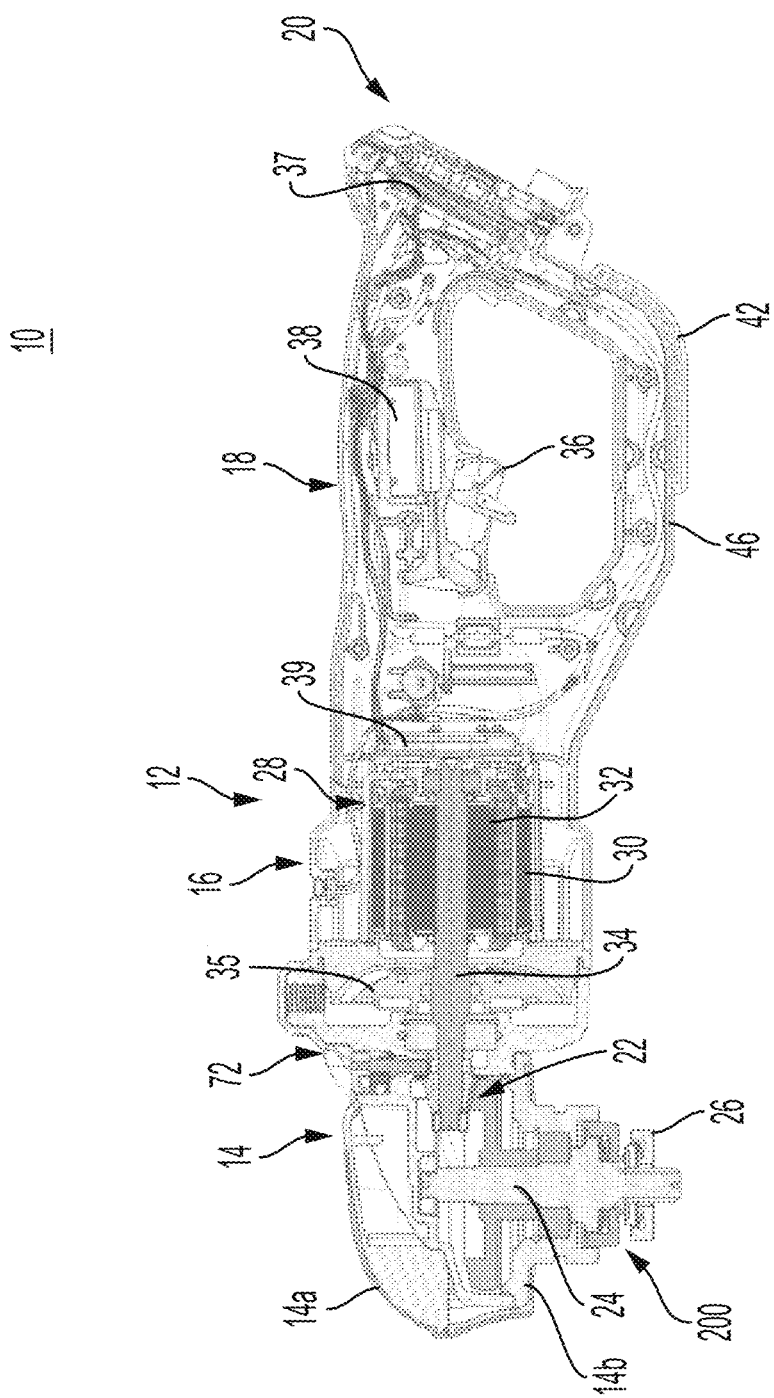
FIG. 1 is a side cross-sectional view of a power tool, according to an embodiment.

The following description illustrates the claimed invention by way of example and not by way of limitation. The description clearly enables one skilled in the art to make and use the disclosure, describes several embodiments, adaptations, variations, alternatives, and uses of the disclosure, including what is presently believed to be the best mode of carrying out the claimed invention. Additionally, it is to be understood that the disclosure is not limited in its application to the details of construction and the arrangements of components set forth in the following description or illustrated in the drawings. The disclosure is capable of other embodiments and of being practiced or being carried out in various ways. Also, it is to be understood that the phraseology and terminology used herein is for the purpose of description and should not be regarded as limiting.

FIG. 1 is a side cross-sectional view of a power tool 10, according to an embodiment. In an embodiment, power tool 10 is provided including a housing 12 having a gear case 14, a motor case 16, a handle portion 18, and a battery receiver 20. Power tool 10 as shown herein is an angle grinder with the gear case 14 housing a gearset 22 that drives an output spindle 24 arranged to be coupled to a grinding or cutting disc (not shown, herein referred to as "accessory wheel"), either via threads on the disc, or via a flange (or threaded nut) 26 and guarded by a disc guard (not shown). It should be understood, however, that the teachings of this disclosure may apply to any other power tool including, but not limited to, a saw, drill, sander, and the like. Gearset 22 may include operate the output spindle 24 at a 90-degree angle orientation or in a linear orientation. In an embodiment, gear case 14 includes an upper gear case cover 14a and a lower gear case cover 14b that cooperative house the gearset 22 components.

In an embodiment, the motor case 16 attaches to a rear end of the gear case 14 and houses a motor 28 operatively connected to the gear set 22. An intermediary plate or baffle may be disposed between the motor case 16 and the rear end of the gear case 14. In an embodiment, the motor 28 is a brushless direct-current (BLDC) motor having a stator 30 and a rotor 32 rotatable relative to the stator 30. The rotor 32 is mounted on a rotor shaft 34 that rotatably drives the output spindle 24 via the gearset 22. A fan 35 is mounted on the rotor shaft 34 between the motor 28 and the gear case 14, facing the intermediary plate or baffle, to generate an airflow for cooing the motor 28 and other components. The airflow generated by the fan 35 exists through an air exhaust vent 72 provided on the motor case 16 and/or the gear case 14.

In an embodiment, the handle portion 18 extends from a rear end of the motor case 16 and includes a trigger assembly 36 operatively connected to a control module 38 disposed within the handle portion 18 for controlling the operation of the motor 28. The battery receiver 20 is provided at a rear end of the handle portion 18 for detachable engagement with a battery pack (not shown) to provide power to the motor 28.

In an embodiment, a second handle 40 is provided that extends from the rear end of the motor case 16 to the battery receiver 20, at least partially in parallel to the handle portion 18. In an embodiment, second handle 40 is a D-handle designed to enhance structural support for the handle portion 18 and the battery pack and improve drop performance of the power tool 10. In an embodiment, second handle 40 is provided with a bumper 42 arranged to absorb shock during drop or impact. In an embodiment, bumper 42 is made of an overmold material.

In an exemplary embodiment, the battery pack may be a 60-volt max lithium-ion type battery pack, although battery packs with other battery chemistries, shapes, voltage levels, etc. may be used in other embodiments. In various embodiments, the battery receiver 20 and battery pack may be a sliding pack disclosed in U.S. Pat. No. 8,573,324, hereby incorporated by reference. However, any suitable battery receiver and battery back configuration, such as a tower pack or a convertible 20V/60V battery pack as disclosed in U.S. patent application Ser. No. 14/715,258 filed May 18, 2015, also incorporated by reference, can be used. The present embodiment is disclosed as a cordless, battery-powered tool. However, in alternate embodiments power tool can be corded, AC-powered tools. For instance, in place of the battery receiver and battery pack, the power tool 10 include an AC power cord coupled to a transformer block to condition and transform the AC power for use by the components of the power tools. Power tool 10 may for example include a rectifier circuit adapted to generate a positive current waveform from the AC power line. An example of such a tool and circuit may be found in US Patent Publication No. 2015/0111480, filed Oct. 18, 2013, which is incorporated herein by reference in its entirety.

In an embodiment, the control module 38 is electronically coupled to a power module that is provided as a part of the same package as the control module 38 or is disposed at a different location of the power tool, for example adjacent the motor 28, to deliver power to the motor 28. In an embodiment, the power module includes six power switches (e.g., FETs or IGBTs) configured as a three-phase inverter switch. The control module 38 controls a switching operation of the power module to regulate a supply of power from the battery pack to the motor 28. The control module 38 uses the input from the trigger assembly 36 to set a target speed for the motor 28. When the trigger assembly 36 is released, in an embodiment, the control module 38 activates the low-side switches or the high-side switches of the power module simultaneously for regenerative electronic braking of the motor. A description of the power and control modules and electronic braking of the motor can be found in US Patent Publication No. 2017/0234484, filed Feb. 10, 2017, which is incorporated herein by reference in its entirety.

Figure 2:
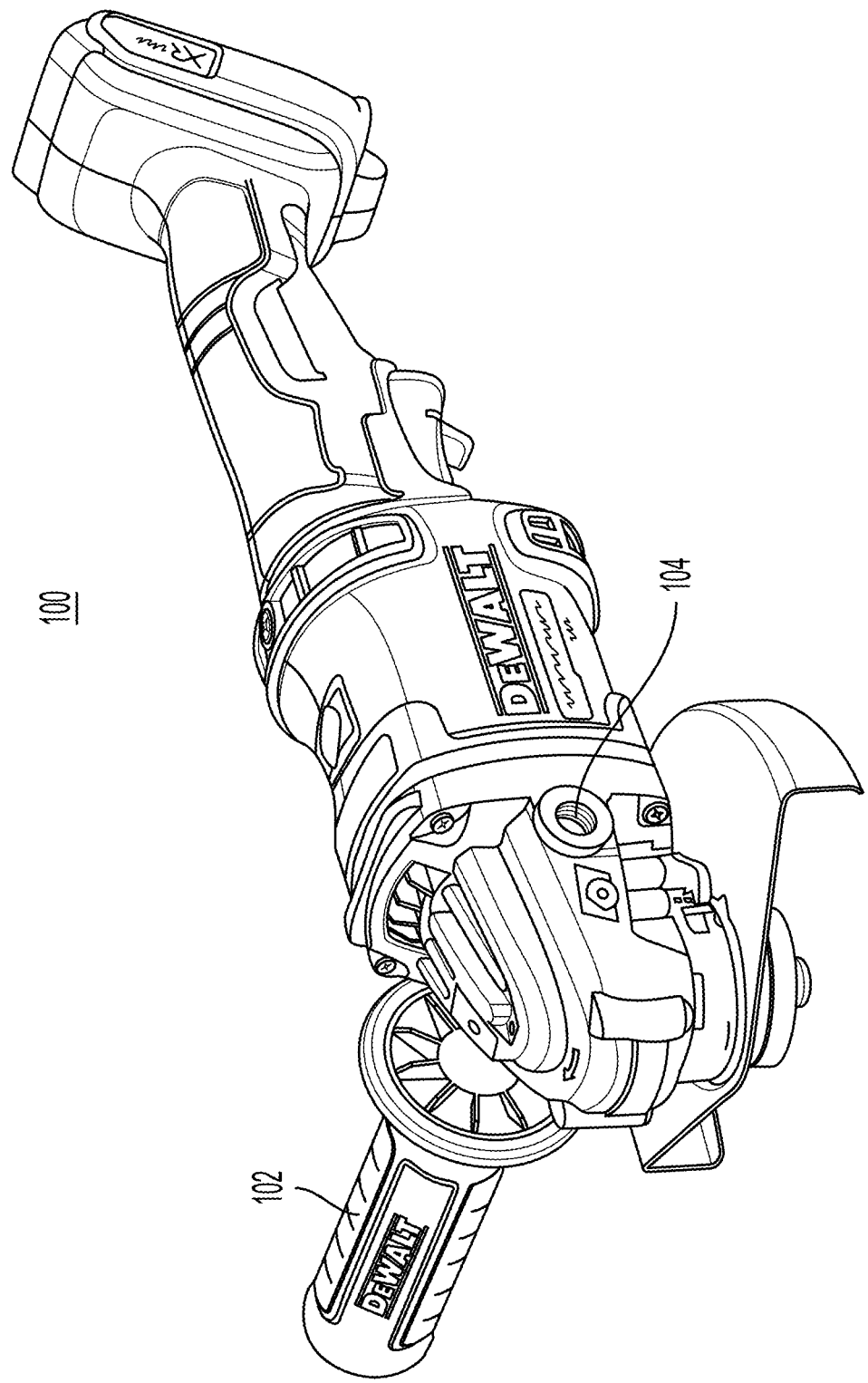
FIG. 2 depicts a conventional grinder and side handle arrangement, according to an embodiment.

FIG. 2 depicts a conventional grinder 100 and side handle 102 arrangement, according to an embodiment. Traditionally, a grinder has one or more mounting locations in the form of threaded openings 104 for attachment of the removeable side handle 120. This allows the grinder 100 to be operated safely in multiple configurations in an ambidextrous manner. A problem experienced by many users is that the side handle 102 threads wear over time owing the forced applied by the user in the course of operating the tool, causing the side handle 102 to become loose and unstable. This can potentially cause loss of control and concentration and should preferably be avoided.

To overcome this problem, according to an embodiment, the grinder mounting location provided for mounting of side handles is keyed to prevent rotation of the side handle relative to the grinder. Furthermore, the side handle is designed such that the main body of the side handle is not required to rotate relative to the grinder to mount the side handle. Rather, a rotatable knob is provided on the side handle that is used to tighten the side handle to the mounting location of the grinder without rotating the main body of the side handle.

Figure 3:
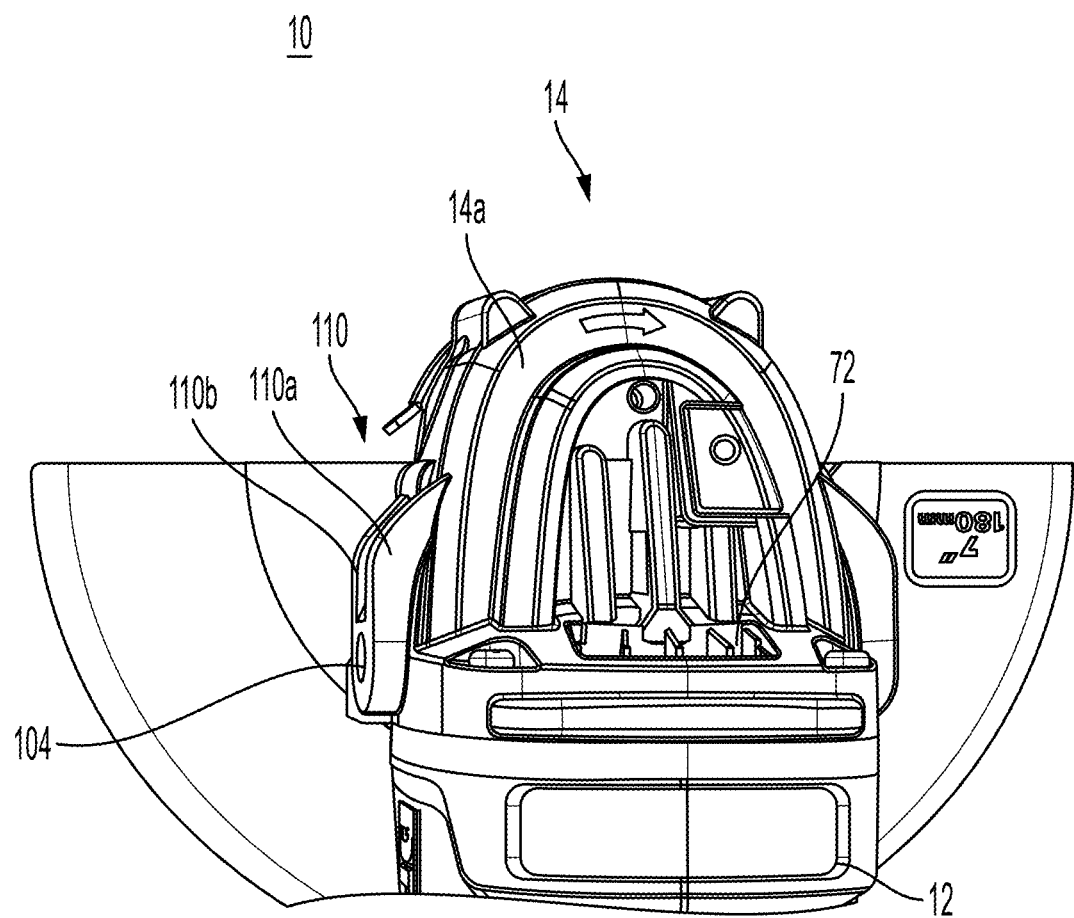
FIG. 3 depicts a perspective partial view of a grinder provided with a keying feature for preventing the rotation of a side handle, according to an embodiment.

FIG. 3 depicts a perspective partial view of grinder 10 provided with a keying feature 110 for preventing the rotation of a side handle, according to an embodiment. In this embodiment, keying feature 110 includes two planar tabs 110a and 110b that project laterally from upper gear case cover 14a of the gear case 14 adjacent threaded opening 104. The two planar tabs 110a and 110b are provided at a distance from one another, extending in parallel axially in the forward direction of the threaded opening 104 to define an open gap therebetween forward of the threaded opening 104. In an embodiment, planar tabs 110a and 110b extend approximately 4 to 8 mm in the lateral direction from the gear case cover 14a.

Figure 4:
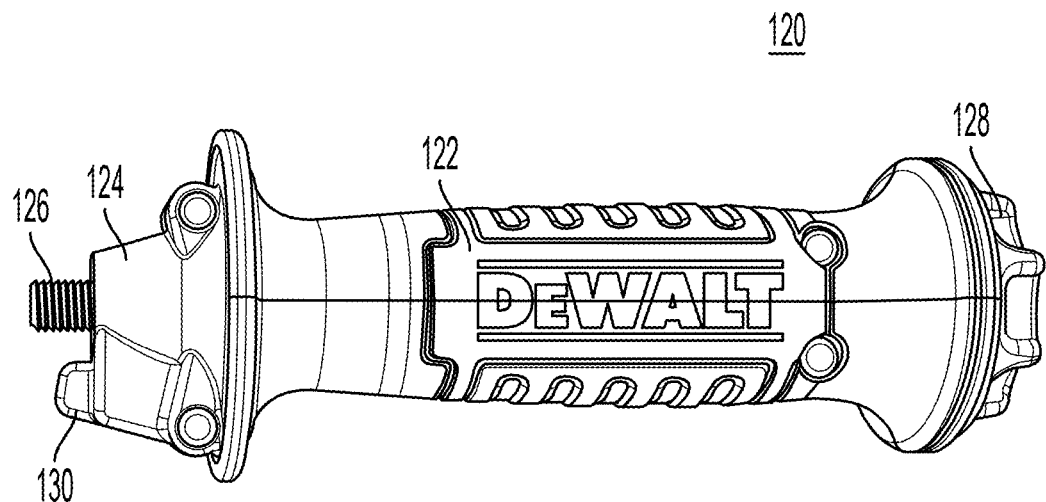
FIGS. 4 and 5 depict side and perspective views of a side handle configured to be mounted on the grinder, including a notch that engages the keying feature, according to an embodiment.
Figure 5:
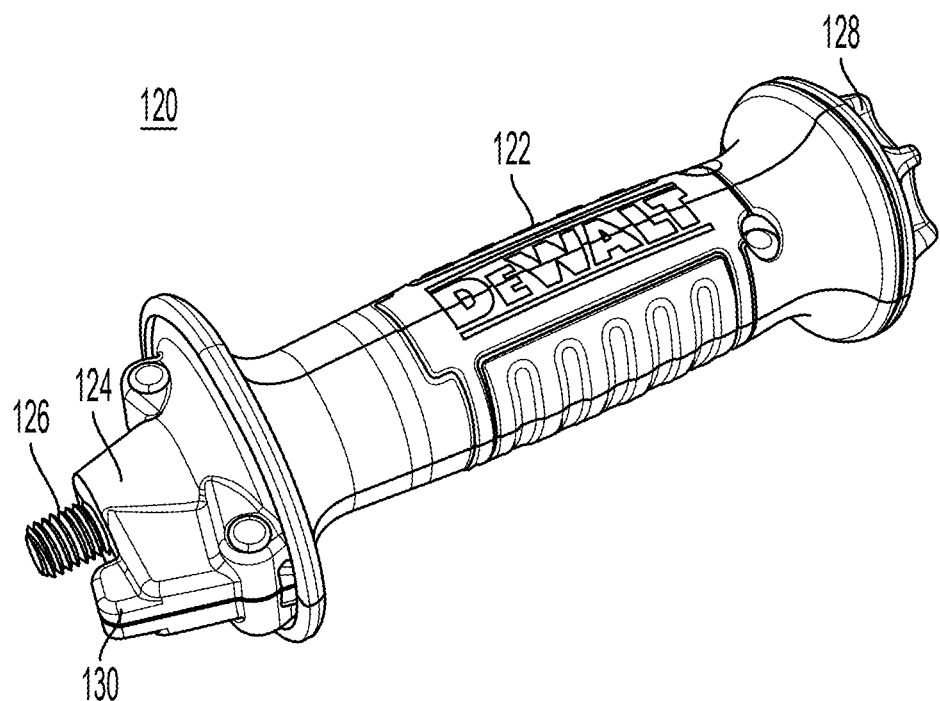
Figure 6:
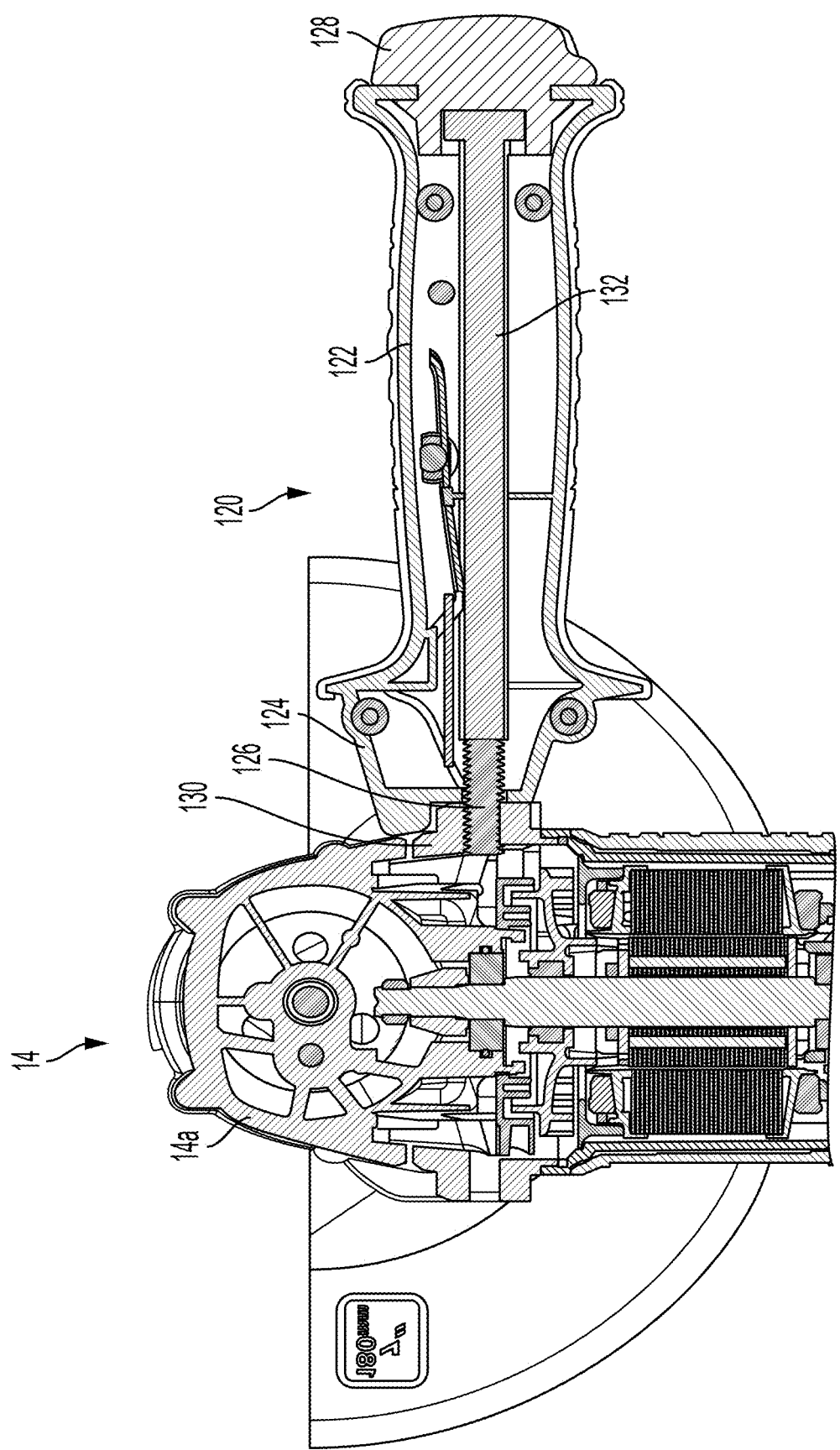
FIG. 6 depicts a top cross-sectional view of the grinder with the side handle mounted, according to an embodiment.
Figure 7:
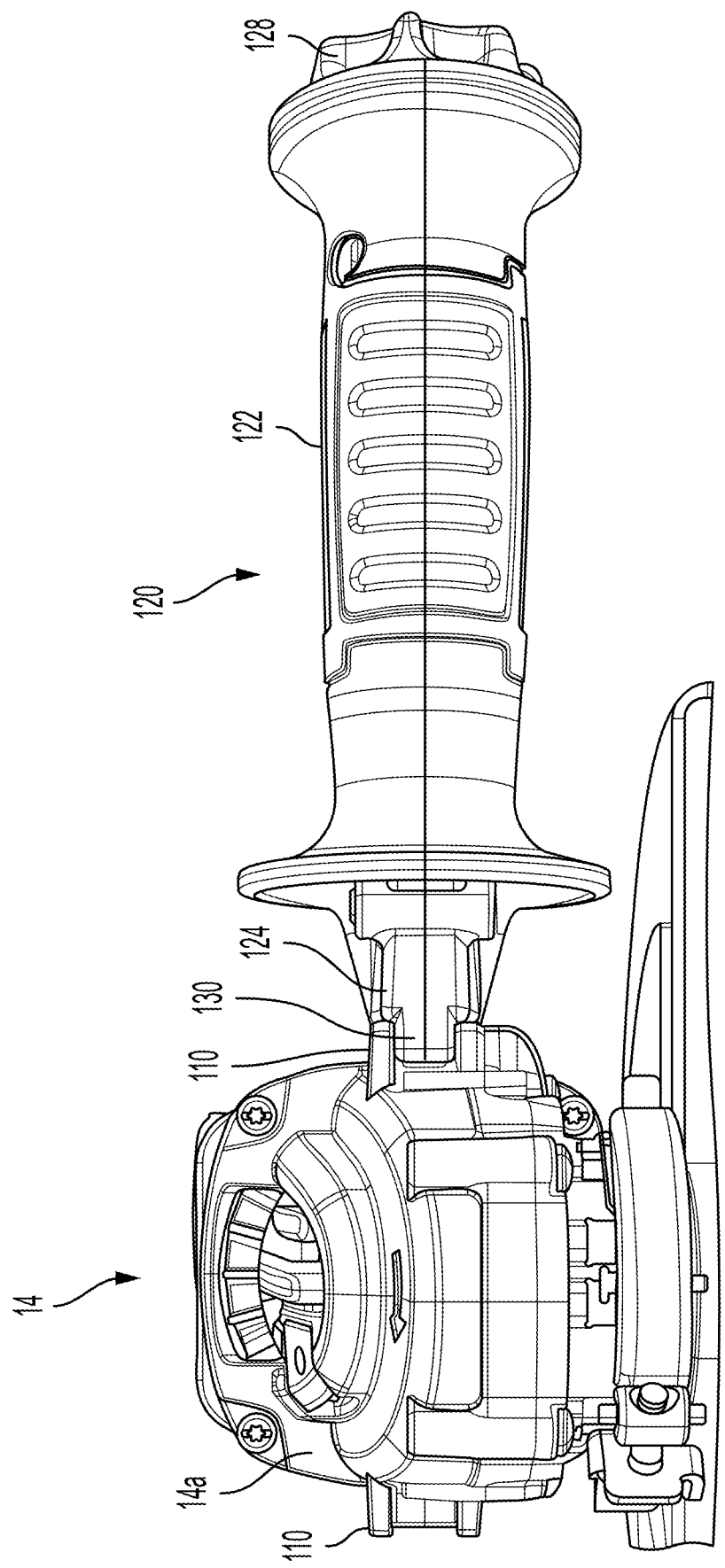
FIG. 7 depicts a perspective view of the grinder with the side handle mounted, according to an embodiment.

FIGS. 4 and 5 depict side and perspective views of a side handle 120 configured to be mounted on the grinder 10, according to an embodiment. FIG. 6 depicts a top cross-sectional view of the grinder 10 with the side handle 120 mounted, according to an embodiment. FIG. 7 depicts a perspective view of the grinder 10 with the side handle 120 mounted, according to an embodiment.

In an embodiment, side handle 120 includes a main gripping body 122 having a frontal end 124 through which a treaded end 126 of a rod extends. A knob 128 is mounted on the other end of the main gripping body 122 opposite the frontal end 124. A notch 130 projects from the frontal end 124.

In an embodiment, the notch 130 is sized to be fittingly received within the gap between the planar tabs 110a and 110b of the keying feature 110. This arrangement ensures that the main gripping body 122 is substantially non-rotatable relative to the grinder 10. Rod 132 extends through the main gripping body 122 and is fixedly coupled to the knob 128. While the main gripping body 122 is non-rotatably held relative to the grinder 10 via the notch 130, the knob 128 and the rod 132 are rotatable relative to the main gripping body 122, allowing the threaded end 126 of the rod 132 to fastened into the threaded opening 104 of the grinder 10. This arrangement ensures that any force applied by the user to the side handle 120 during normal operation of the grinder 10 does not cause further rotation of the side handle 120, causing the threaded end 126 of the rod 132 to wear and loosen over time.

Figure 8:
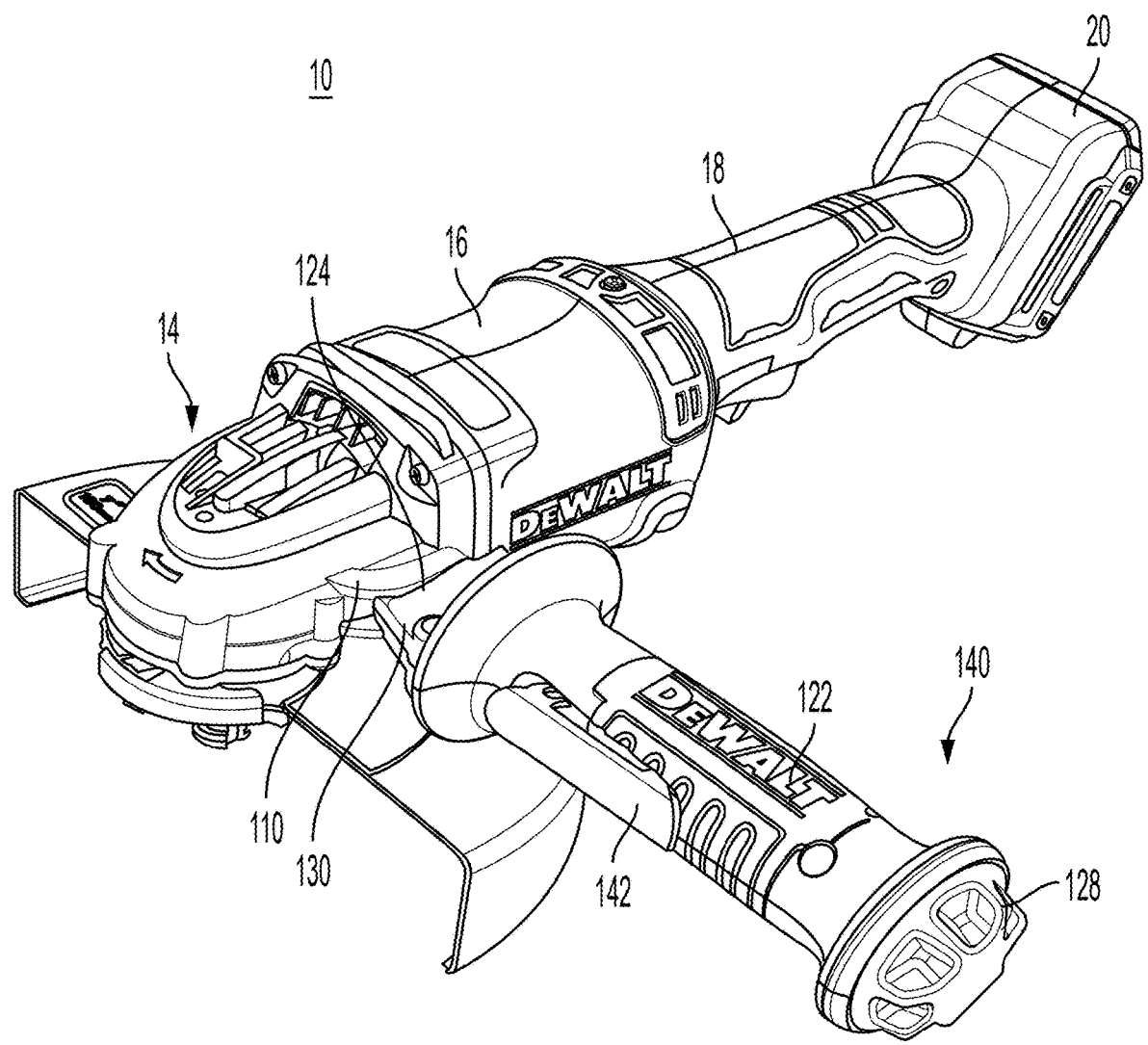
FIG. 8 depicts a perspective view of the grinder and a side handle provided with a trigger switch, according to a further and/or alternative embodiment.
Figure 9:
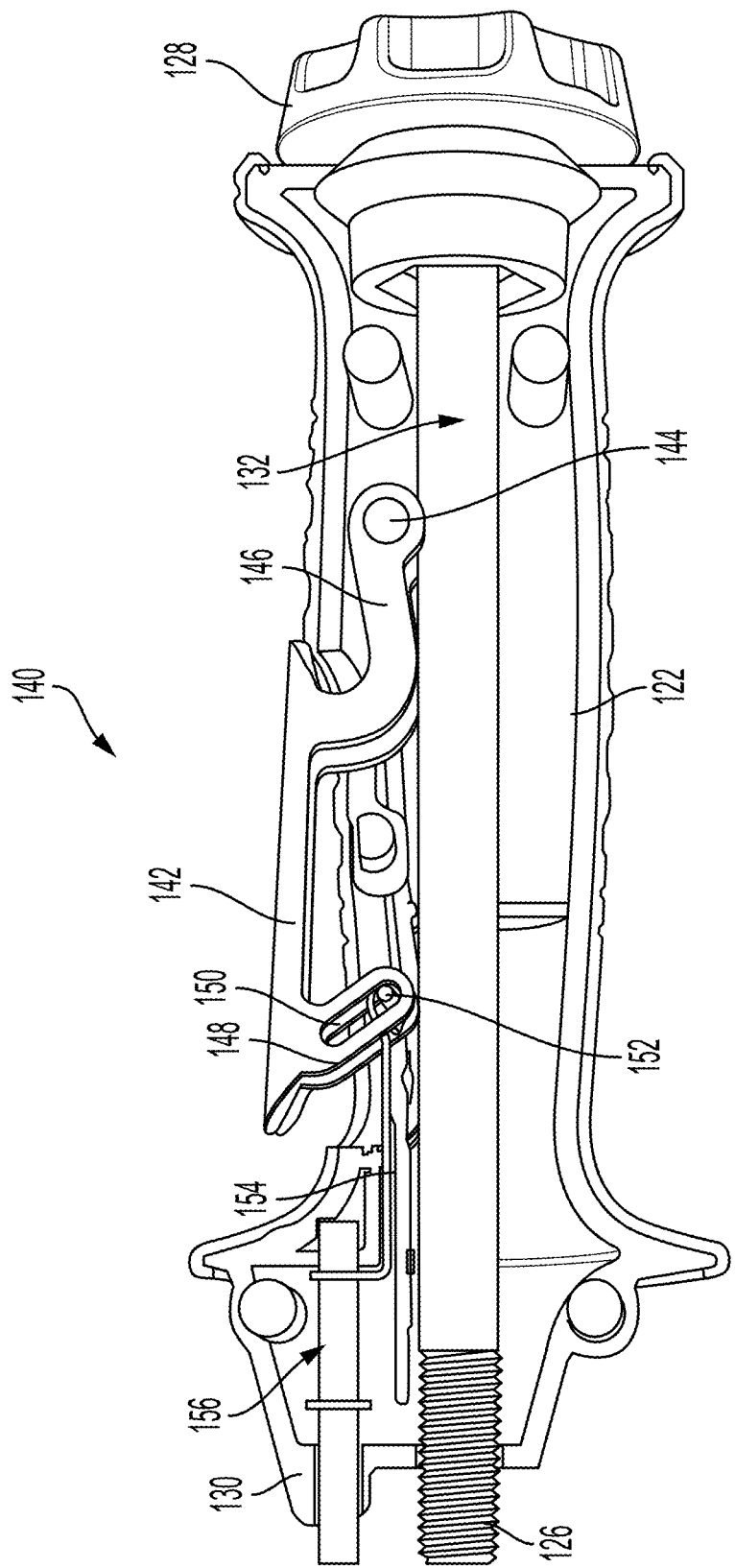
FIG. 9 depicts a side view of the side handle with the trigger switch, according to an embodiment.

FIG. 8 depicts a perspective view of the grinder 10 and a side handle 140 further provided with a trigger switch 142, according to a further and/or alternative embodiment. FIG. 9 depicts a side view of the side handle 140, according to an embodiment. In this embodiment, to the extent that side handle 140 includes the same features described above, the same reference numerals are used. In an embodiment, trigger switch 142 is actuatable by the user when the user's hand is on the main gripping body 122 of the side handle 140. In an embodiment, the grinder 10 is configured to energize the motor 28 only if the trigger switch 142 is pressed by the user. The non-rotatable configuration of the main gripping body 122 ensures that the trigger switch 142 is always forward of the main gripping body 122 along the axial direction of the grinder 10.

In an embodiment, side handle 140 is provided with a pivot pin 144 that supports an end of first legs 146 the trigger switch 142 relative to the main gripping body 122. Pressing the trigger switch 142 relative the main gripping body 122 causes rotation of the main gripping body 122 around the pivot pin 144, moving second legs 148 of the trigger switch 142 into main gripping body 122 partially along two sides of the rod 132. The second legs 148 include elongated apertures 150 that extends at approximately a 40 to 60 degree angle relative to the axis of the rod 132 and together support a laterally-oriented bar 152. The bar 152 is in turn coupled, via a link member 154, to a plunger 156 that extends in parallel to the rod 132. The plunger 156 extends adjacent the threaded end 126 through the notch 130 at a distance of approximately 4 mm to 14 mm from the rod 132. The angular orientation of the elongated apertures 150 causes the link member 154, and therefore the plunger 156, to move forward (i.e., in the direction of the grinder 10) as the trigger switch 142 is pressed. A spring member (not shown) biases the plunger 156 in the rearward direction away from grinder 10. Alternatively, the spring member may be provided to bias the trigger switch 142 away from the main gripping body 122.

Figure 10:
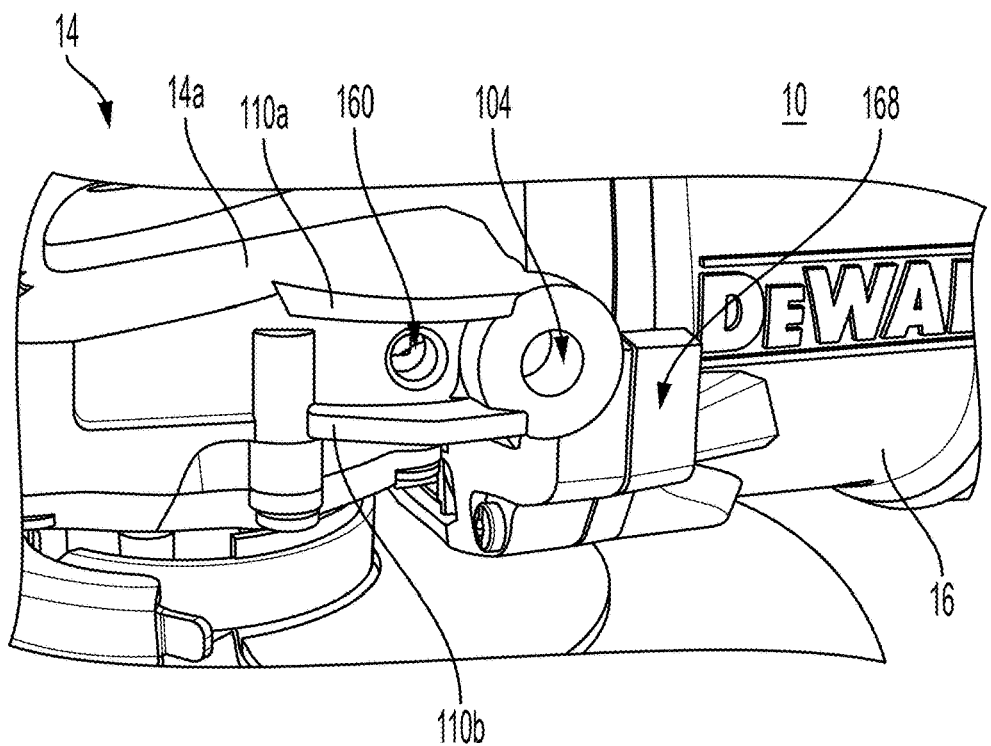
FIG. 10 depicts a perspective view of the grinder provided with plunger pin holes, according to an embodiment.
Figure 11:
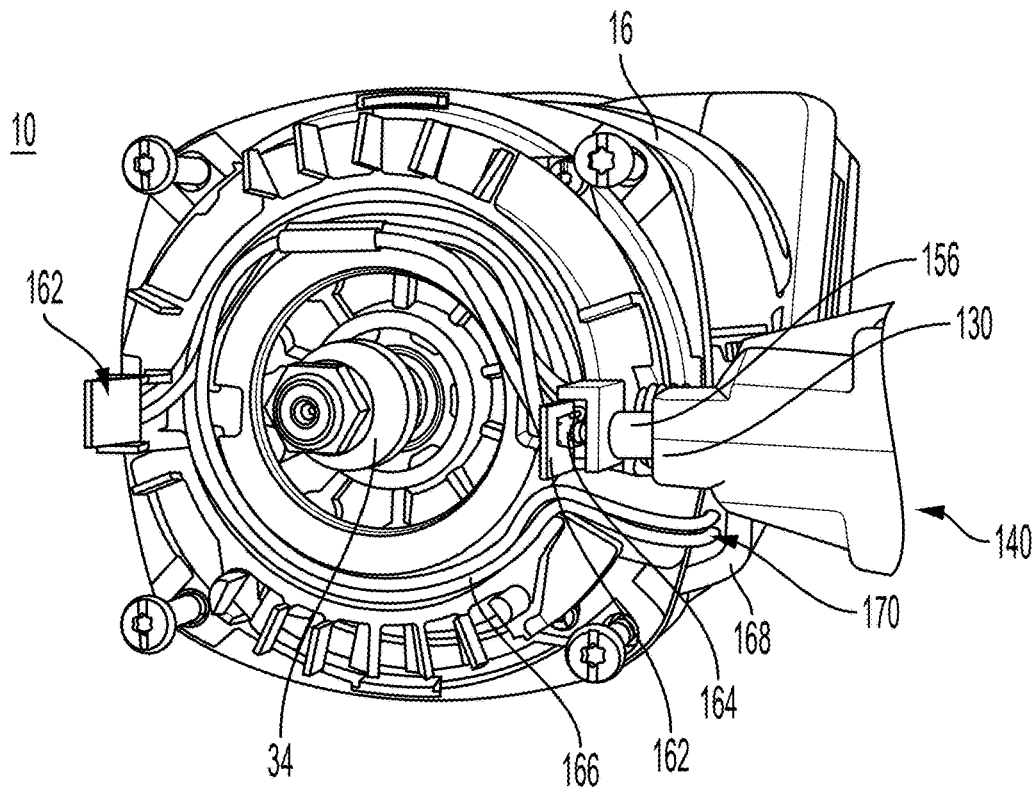
FIG. 11 depicts a partial view of the grinder with gear case removed, showing the side handle mounted on the grinder, according to an embodiment.
Figure 12:
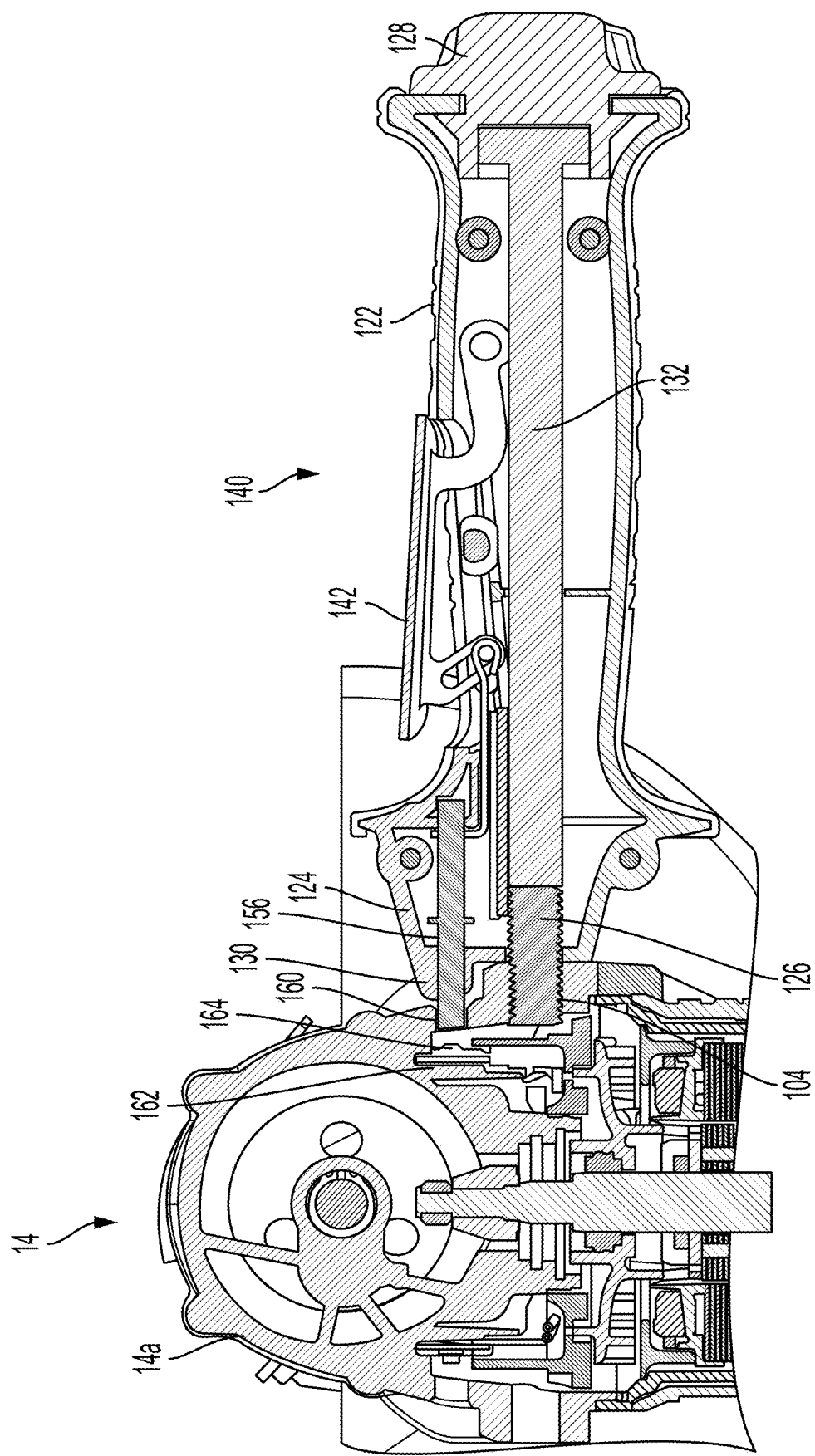
FIG. 12 is a top cross-sectional view of the grinder with the side handle mounted, according to an embodiment.

FIG. 10 depicts a perspective view of the grinder 10, according to an embodiment. FIG. 11 depicts a partial view of the grinder 10 with gear case 14 removed, showing the side handle 140 mounted on the grinder 10. FIG. 12 is a top cross-sectional view of the grinder 10 with the side handle 140 mounted, according to an embodiment.

Figure 13:
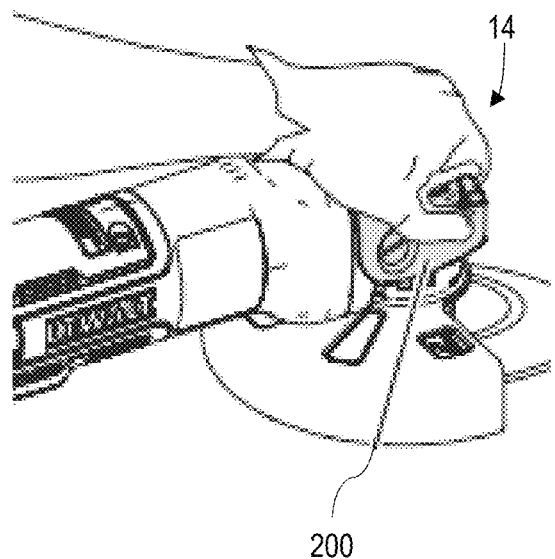
FIG. 13 depicts a perspective view of the power tool provided with a mountable gear case grip accessory instead of the side handle, according to an embodiment.

As shown in these figures, in an embodiment, grinder 10 is provided with plunger pin holes 160 on opposite sides of the gear case 14 adjacent to and axially forward of the threaded openings 104. In an embodiment, each plunger pin hole 160 is located within the gap formed between the planar tabs 110a, 110b of the keying feature 110. In an embodiment, a circuit board 162 is secured within the gear case 14 radially inward of each of the plunger pin holes 160. An electronic switch 164 is mounted on each of the circuit boards 162 radially inline with the corresponding plunger pin hole 160. A series of wires 166 are routed between the two circuit boards 162 around the rotor shaft 34. The wires 166 are directed from the gear case 14 into the motor case 16 through a cavity 170 formed by a projection portion 168 of the motor case 16 adjacent the threaded opening 104. The wires 166 are routed through the motor case 16 and are coupled to a controller (not shown) located downstream from the motor 28 that control supply of power to the motor 28. The electronic switch 164 is positioned such that, when the trigger switch 142 of the side handle 140 is pressed, the end of the plunger 156 makes contact with the electronic switch 164 to transmit a signal through the wires 166 to the controller, alerting the controller to begin operating the motor 28. In an embodiment, the controller may be mounted FIG. 13 depicts a perspective view of a power tool 10 provided with a mountable gear case grip accessory 200 instead of the side handle 140, according to an embodiment. The grip accessory 200 is provided as a replacement for the side handle 140 in applications where usage of a side handle is not desirable by the operators. An example of this is in pipeline cutting and grinding applications, where the tool is used in smaller spaces or perpendicularly to the surface of the pipeline. The grip accessory 200 is provided to ensure that the operator properly grips the gear case 14 of the power tool 10 with a second hand, while holding the main body of the power tool 10 with a first hand, thus preventing a single-hand operation of the power tool 10.

Figure 14:
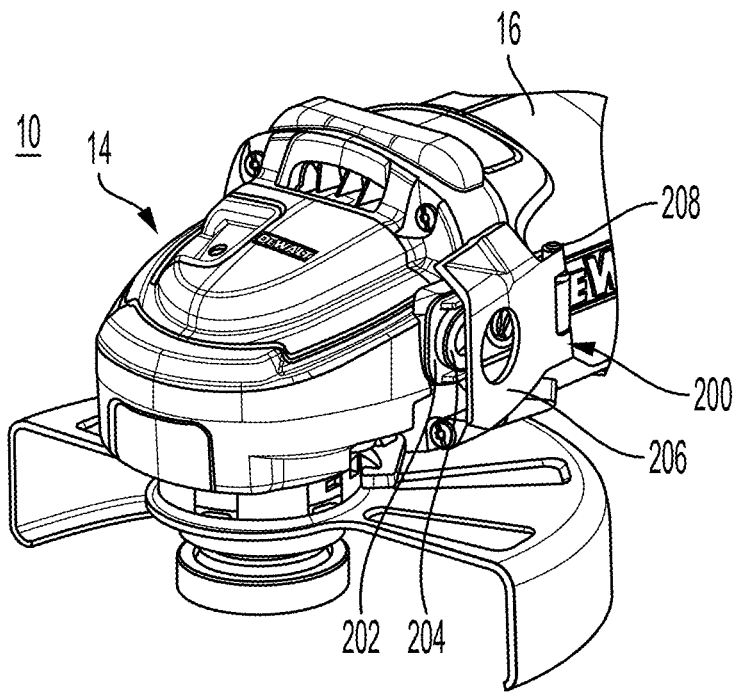
FIG. 14 depicts a partial perspective view of the power tool including the grip accessory in a default (released) position, according to an embodiment.
Figure 15:
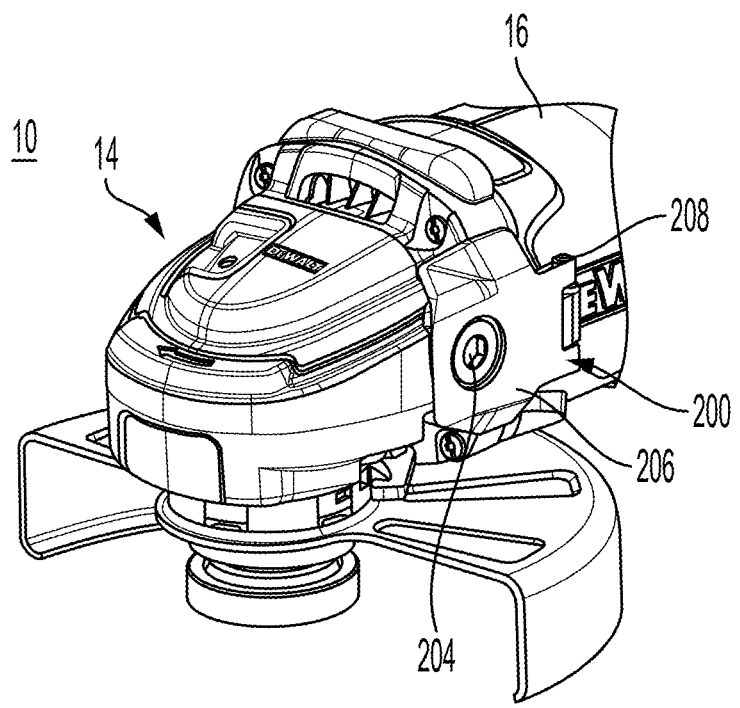
FIG. 15 depicts a partial perspective view of the power tool including the grip accessory in a depressed position, according to an embodiment.
Figure 16:
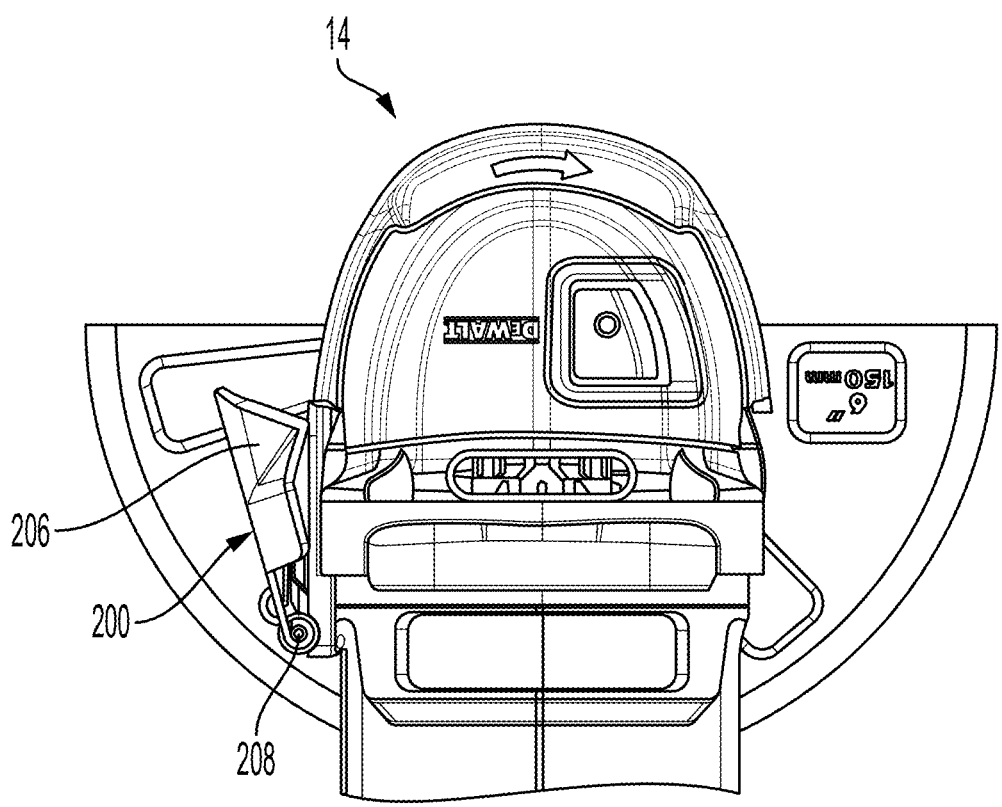
FIG. 16 depicts a partial top view of the power tool with the grip accessory in the default position, according to an embodiment.

FIG. 14 depicts a partial perspective view of the power tool 10 including the grip accessory 200 in a default (released) position. FIG. 15 depicts a partial perspective view of the power tool 10 including the grip accessory 200 in a depressed position. FIG. 16 depicts a partial top view of the power tool 10 with the grip accessory 200 in the default position.

In an embodiment, grip accessory 200 includes a mount member 202 that is removably mounted to a side of the gear case 14 via a fastener 204, and a trigger member 206 that is pivotably attached to the mount member 202 via a pivot pin 208. The fastener 204 is fastened into one of the threaded openings 104 of the gear case 14 previously discussed. It is noted that in this embodiment, the plunger pin holes 160 are located rearward of the threaded openings 104. When the operator grips the gear case 14, the palm of the operator's hand presses against the trigger member 206 and causes it to activate the electronic switch 164 through the plunger pin hole 160 previously discussed, thus activating supply of power to the power tool motor. Thus, without the operator actively pressing the trigger member 206 against the gear case 14, the power tool cannot be activated.

Figure 17:
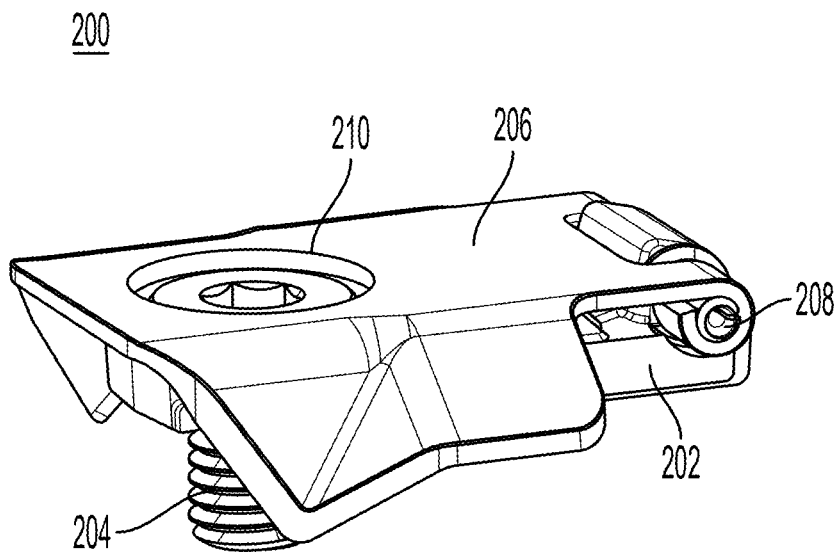
FIGS. 17 and 18 depict perspective views of the grip accessory, according to an embodiment.
Figure 18:
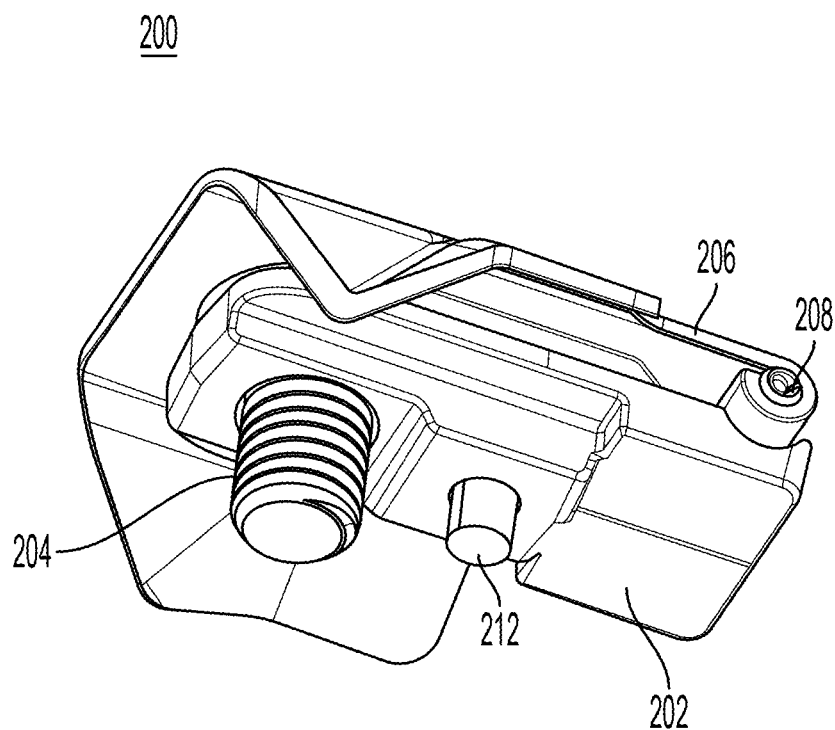
Figure 19:
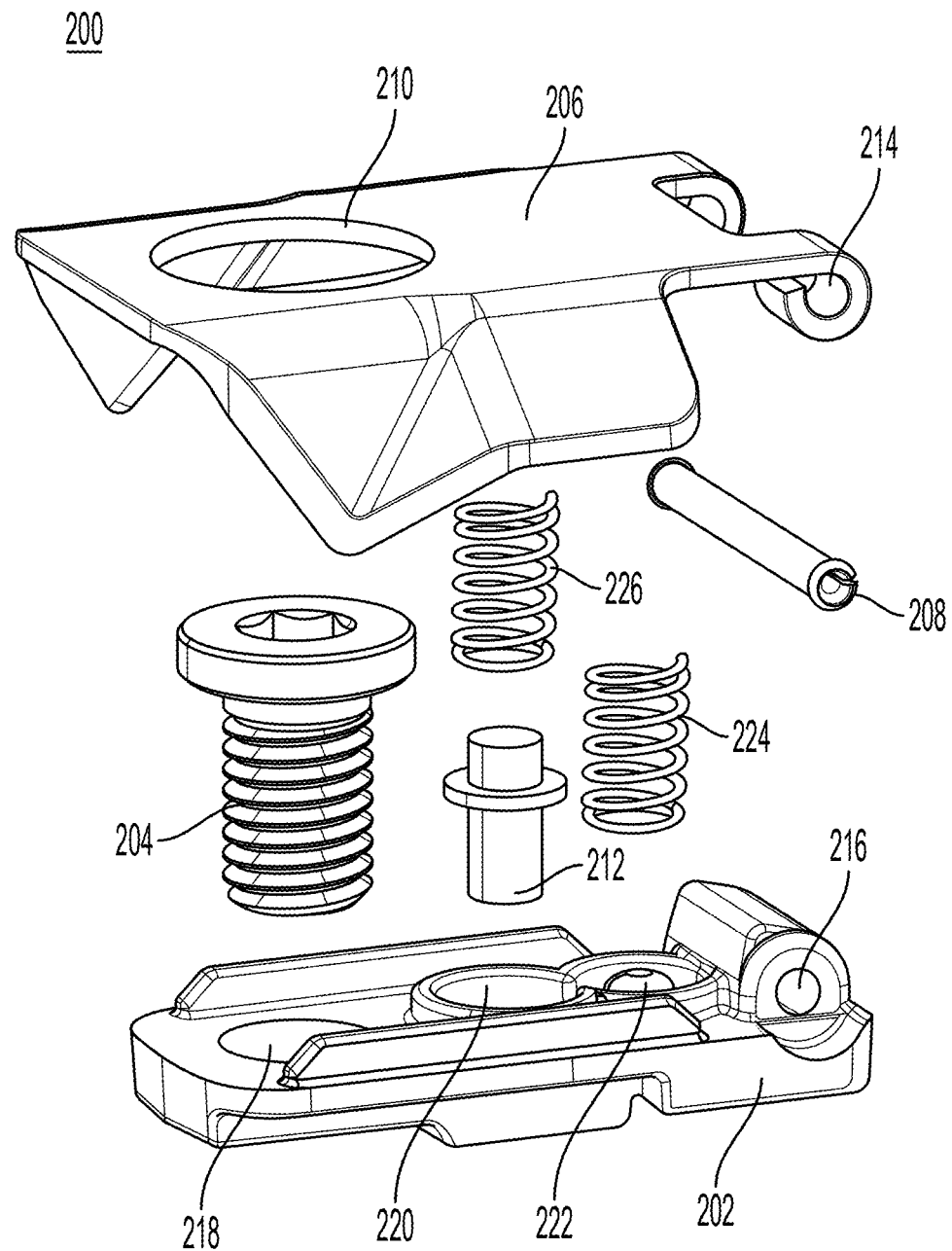
FIG. 19 depicts an exploded view of the grip accessory, according to an embodiment.
Figure 20:
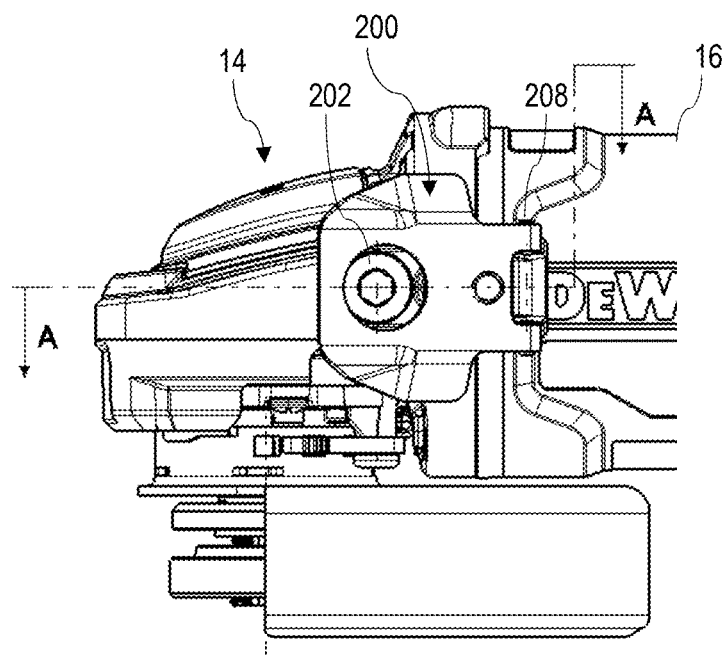
FIG. 20 depicts a side view of the power tool with the grip accessory mounted identifying a plane A-A, according to an embodiment.
Figure 21:
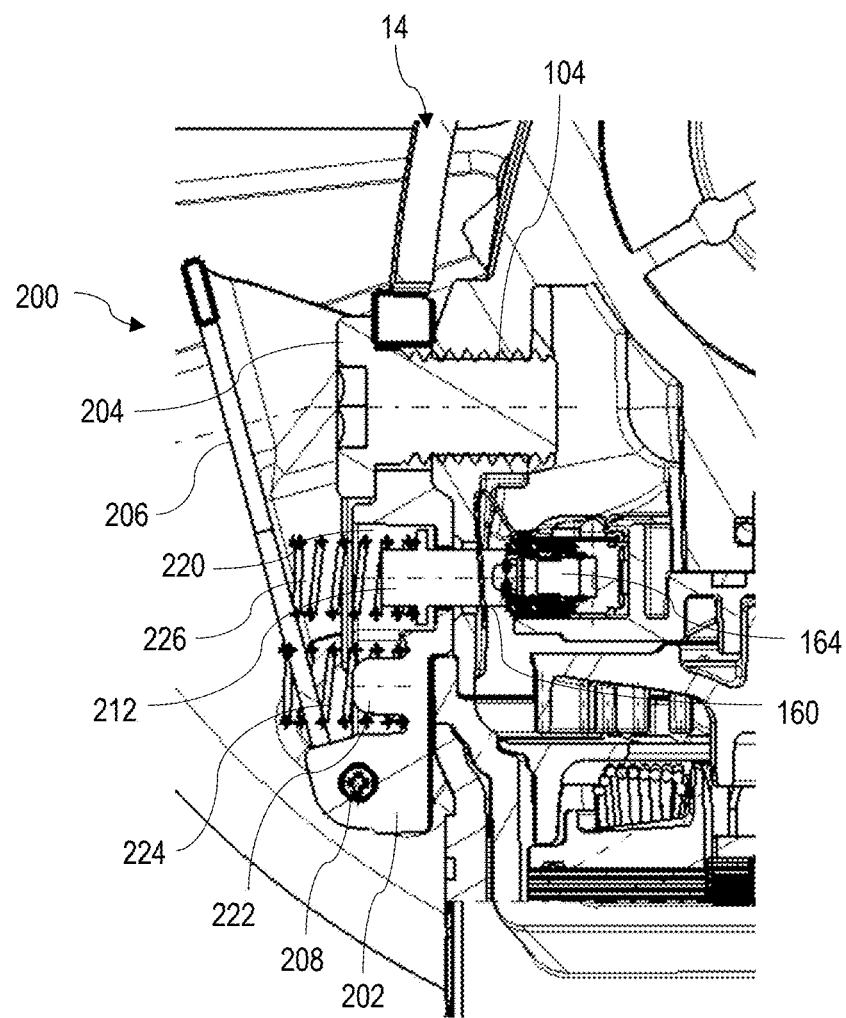
FIG. 21 depicts a cross-sectional view of the power tool and the grip accessory along the plane A-A of FIG. 20, according to an embodiment.

FIGS. 17 and 18 depict perspective views of the grip accessory 200, according to an embodiment. FIG. 19 depicts an exploded view of the grip accessory 200, according to an embodiment. FIG. 20 depicts a side view of the power tool 10 with the grip accessory 200 mounted identifying a plane A-A, according to an embodiment. FIG. 21 depicts a cross-sectional view of the power tool 10 and the grip accessory 200 along the plane A-A of FIG. 20, according to an embodiment.

In an embodiment, in addition to the components described above, grip accessory 200 includes a pin 212 that is pressed by the trigger member 206 into the plunger pin hole 160 to activate the electronic switch 164. In an embodiment, the pin 212 is mounted within a pin receptacle 220 of the mount member 202 and partially penetrates through an opening of the receptacle 220. A first spring 226 biases the pin 212 away from the opening. Actuation of the trigger member 206 causes the pin 212 to slide through the opening of the receptacle 220 and the plunger pin hole 160 against the biasing force of the first spring 226 and activate the electronic switch 164.

In an embodiment, the trigger member 206 and the mount member 202 respectively include loops 214 and pivot pin receptacle 216 that provide a structure for pivoting attachment of the trigger member 206 to the mount member 202 via the pivot pin 208. A second spring 224 is mounted on a spring post 222 of the mount member 202 to bias the trigger member 206 away from the mount member 202.

In an embodiment, the trigger member 206 includes a first opening 210 through which the fastener 204 in its entirety is receives, and the mount member 202 includes a second opening 218 having a smaller diameter than the first opening 210 through which the threaded portion of the fastener 204 is received for fastening into the threaded openings 104 of the gear case 14. This arrangement allows the operator to mount and dismount the grip accessory 200 on either side of the gear case 14. In an embodiment, the pin receptacle 220 is located between the second opening 218 and the spring post 222.

An alternative grip accessory 300 is described herein with reference to FIGS. 22 to 27, according to an embodiment.

Figure 22:
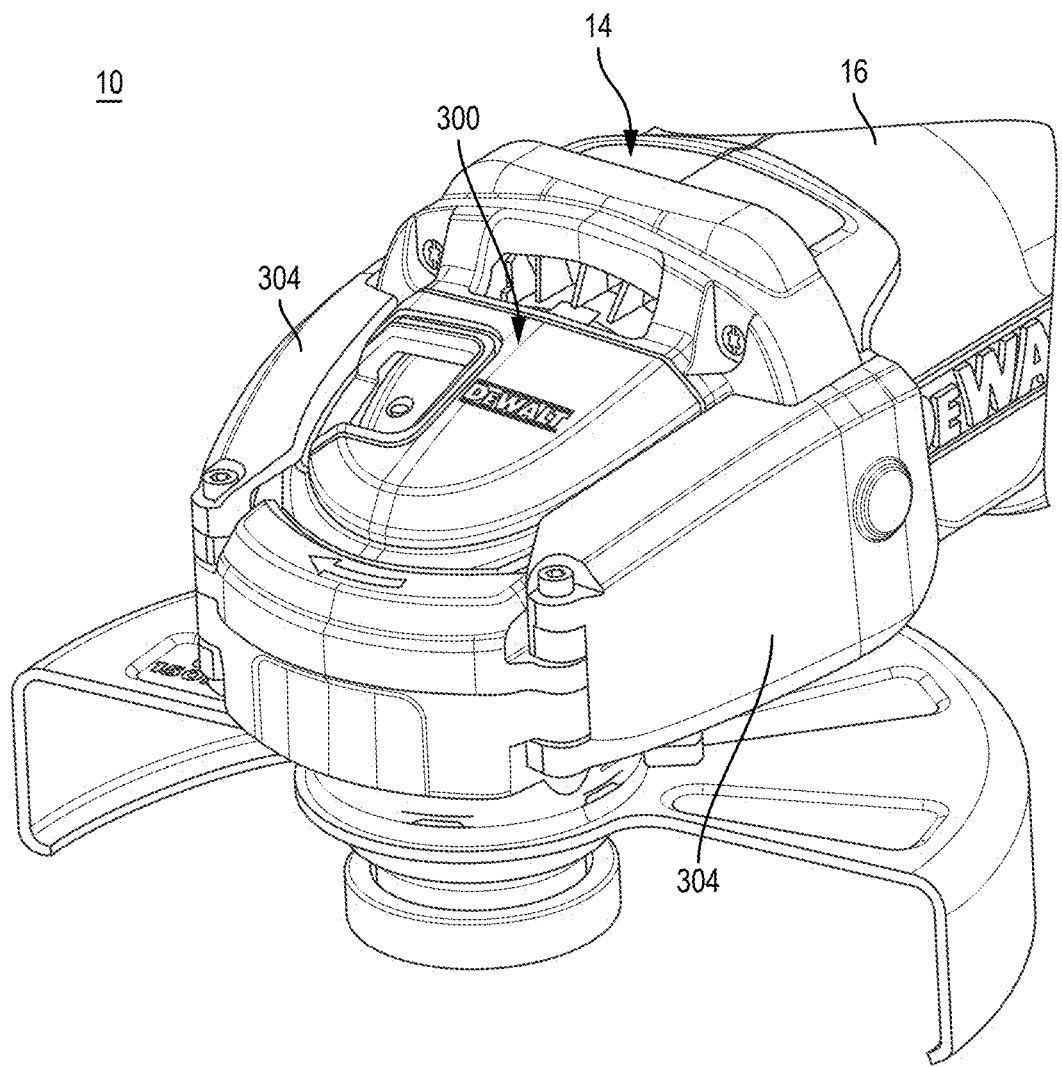
FIG. 22 depicts a partial perspective view of the power tool including the grip accessory, according to an embodiment.
Figure 23:
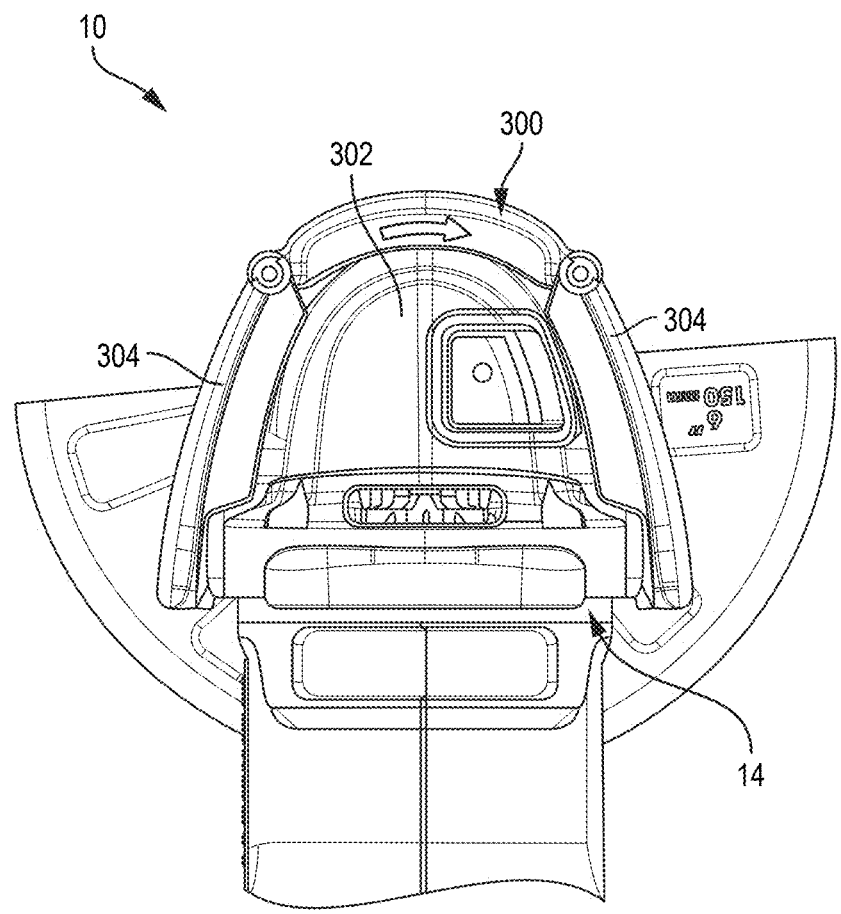
FIG. 23 depicts a partial top view of the power tool and the grip accessory, according to an embodiment.

FIG. 22 depicts a partial perspective view of the power tool 10 including the grip accessory 300, according to an embodiment. FIG. 23 depicts a partial top view of the power tool 10 and the grip accessory 300, according to an embodiment.

In an embodiment, grip accessory 300 includes a cover 302 that is mounted on the gear case 14 of the power tool 10, and two triggers 304 pivotably mounted to the cover 302 that can be actuated by the operator's palm from either side of the gear case 14. Each trigger 304 is engageable with a respective one of the electronic switches 164 provided on opposite sides of the gear case 14. The power tool 10 is thus activated by the operator pressing either of the triggers 304 towards the gear case 14, thus providing flexibility to the operator on how to hold the gear case 14 and which trigger 304 to press.

Figure 24:
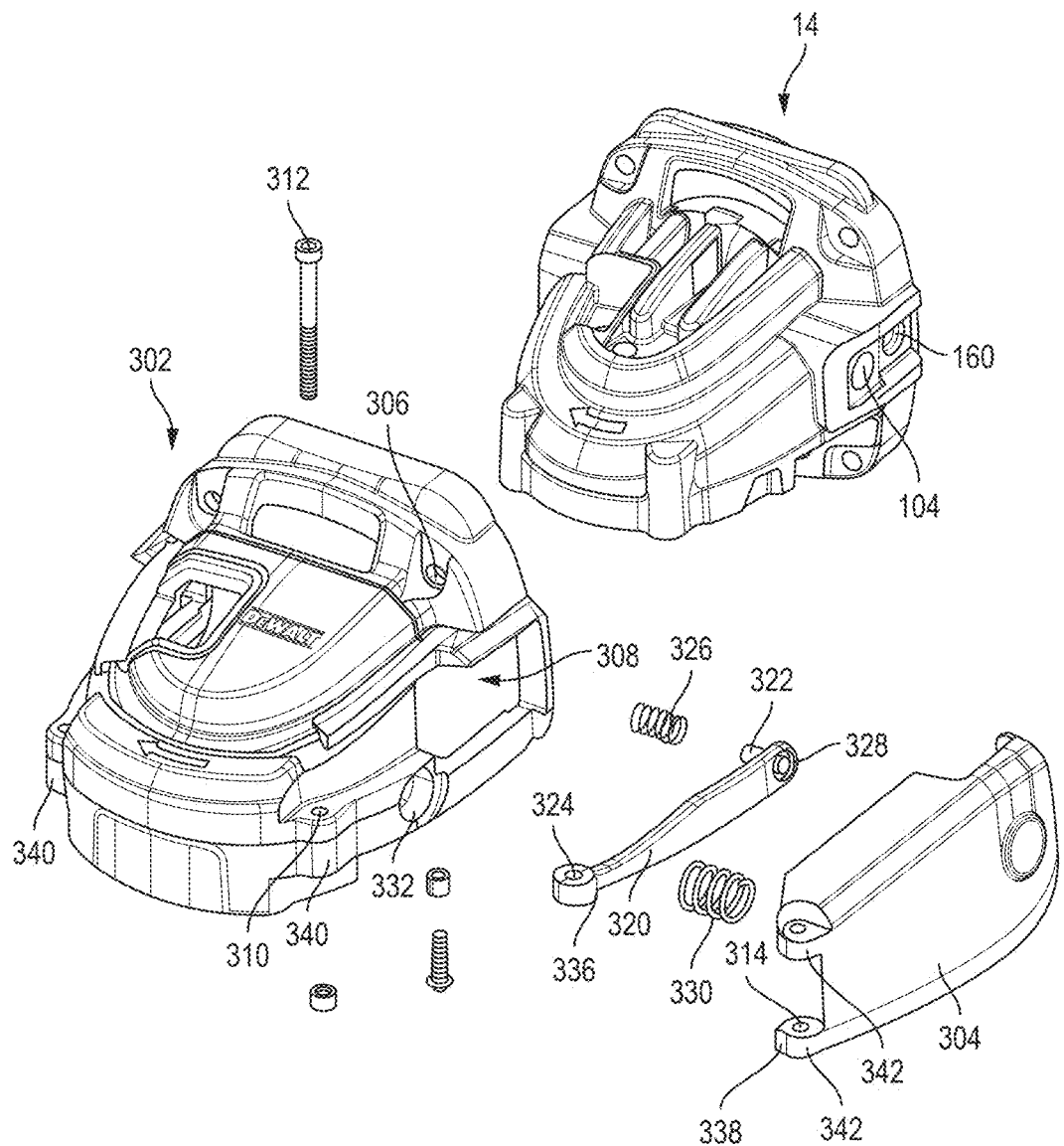
FIG. 24 depicts a partial exploded view of the grip accessory, according to an embodiment.

FIG. 24 depicts a partial exploded view of the grip accessory 300, according to an embodiment. In this embodiment, only one of the two triggers 304 are shown for simplicity.

In an embodiment, cover 302 includes a series of screw holes 306 that receive fasteners (not shown) for fastening the cover 302 to the gear case 14. In an embodiment, an operator may unfasten the fasteners that secure the gear case 14 to the housing 12, mount the cover 302, and fasten the fasteners once again passing through the screw holes 306 to secure the cover 302 to the gear case 14. In an embodiment, the cover 306 further includes two side openings 308 aligned with threaded openings 104 and plunger pin holes 160 on two sides of the gear case 14. In addition, the cover 306 includes additional openings aligned with exhaust vents, spindle lock, and other features of the gear case 14. In an embodiment, the cover 306 also includes two side projections 340 respectively including pivot pin receptacles 310 disposed forward of the side openings 308 that pivotably support the triggers 304 via pivot pins 312.

In an embodiment, each trigger 304 includes two end tabs 342 extending laterally at its front end that are spaced apart and form pin receptacles 314 therein. The pin receptacles 314 receive a respective pivot pin 312 to pivotably couple the trigger 304 to the respective side projection 340 of the cover 306. In an embodiment, additionally pivotably coupled to each pivot pin 312 is an idler arm 320. The idler arm 320 includes a pin receptacle 324 on its frontal end that is aligned with pin receptacles 310 and 314 and through which the pivot pin 312 passes. The idler arm 324 extends substantially parallel to the longitudinal axis of the power tool adjacent an inner surface of the trigger 304 and includes a pin 322 that perpendicularly projects from its rear end in the direction of the gear case 13. The pin 322 is aligned with the plunger pin hole 160 of the power tool 10. In an embodiment, pressing the trigger 304 towards the gear case 14 causes the pin 322 of the idler arm 324 to engage and activate the electronic switch 164 located within the plunger pin hole 160.

In an embodiment, an overtravel spring 326 is positioned between an annular recess 328 of the idler arm 324 and the trigger 304 to pivotably bias the idler arm 324 away from the trigger 304 in the direction of the gear case 14. This spring 326 prevents overtravel of the idler arm 324 away from the gear case 14. In an embodiment, a trigger spring 330 is positioned between a pocket 332 of the gear case 14 and the trigger 304 to pivotably bias the trigger 304 away from the gear case 14.

Figure 25:
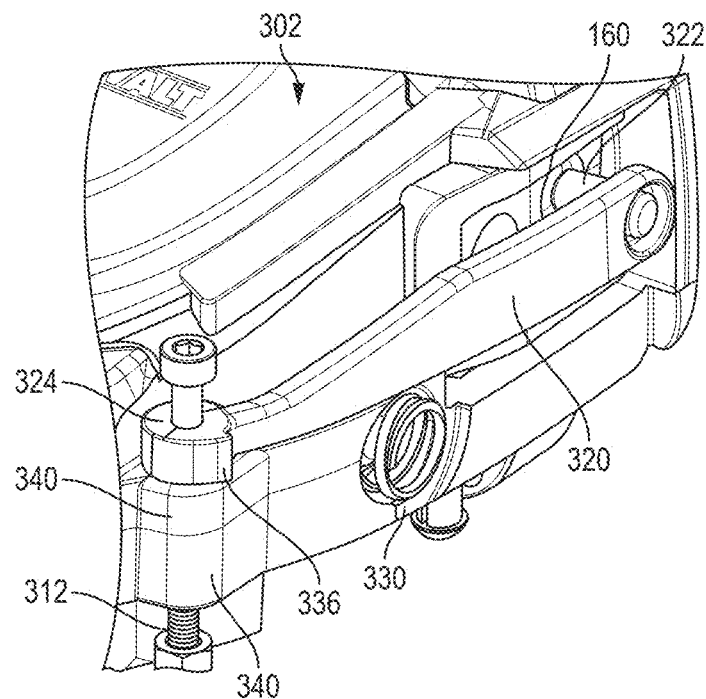
FIG. 25 depicts a partial view showing the idler arm alone pivotably mounted to the pivot pin, according to an embodiment.
Figure 26:
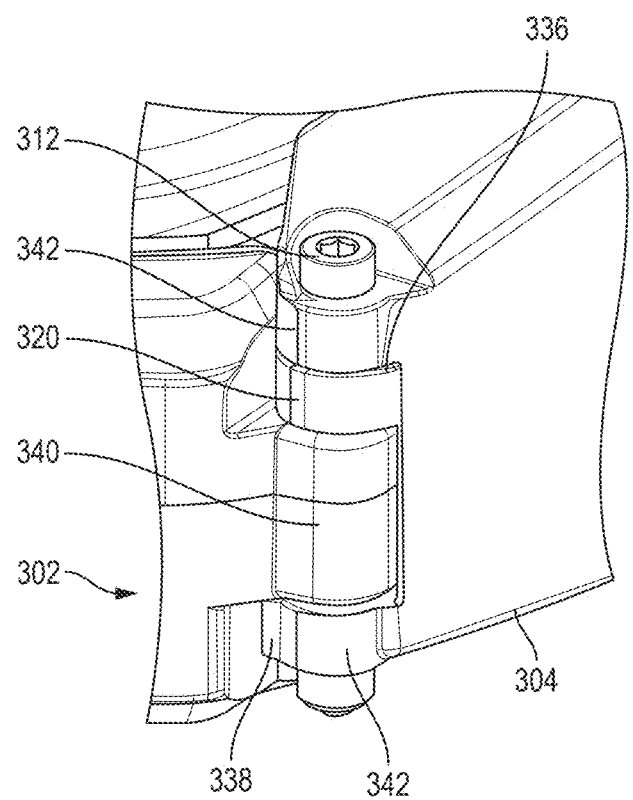
FIG. 26 depicts a partial view of the pivoting structure of the idler arm and the trigger, according to an embodiment.
Figure 27:
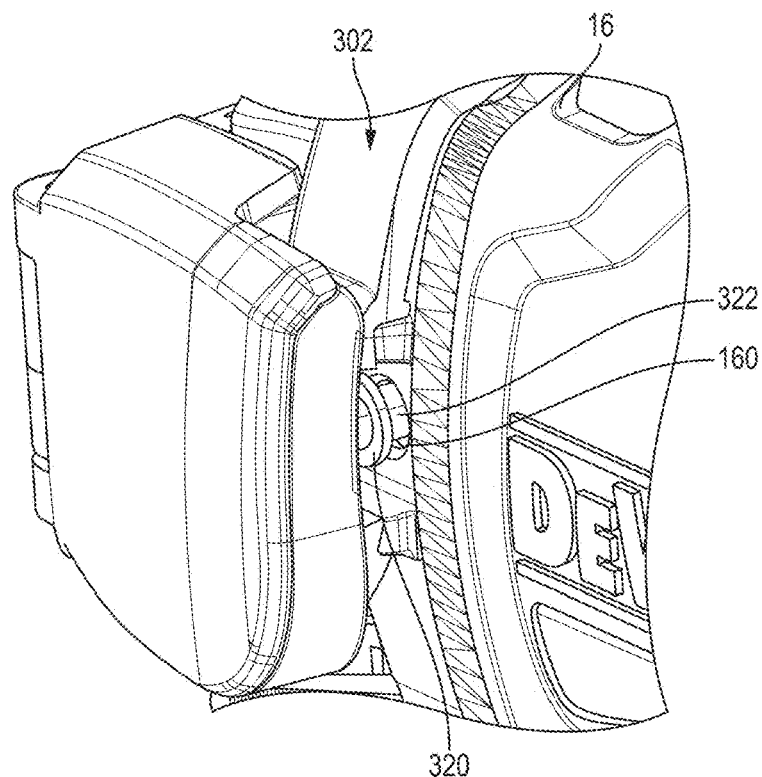
FIG. 27 depicts another perspective view of the trigger showing the idler arm in the default (disengaged) position, according to an embodiment.

FIG. 25 depicts a partial view showing the idler arm 320 alone pivotably mounted to the pivot pin 312, according to an embodiment. FIG. 26 depicts a partial view of the pivoting structure of the idler arm 320 and the trigger 304, according to an embodiment. FIG. 27 depicts another perspective view of the trigger 304 showing the idler arm 320 in the default (disengaged) position, according to an embodiment.

In an embodiment, the idler arm 320 includes a projected edging 336 formed near its frontal end adjacent the pin receptacle 324. This projected edging 336 engages a front end of the trigger 340 to limit the separation and the travel range of the idler arm 320 relative to the trigger 304. This arrangement cooperates with the overtravel spring 326 to ensure that the idler arm 320 is maintained at a distance from the electronic switch 164 located within the plunger pin hole 160 in the released position of the trigger 304. This arrangement also ensures that the overtravel spring 326 remains in place during the assembly process.

Additionally, in an embodiment, the trigger 304 includes a projected edging 338 projecting from one of the end tabs 342. This projected edging 338 engages the cover 302 to limit the separation and the travel range of the trigger 304 relative to the cover 302, particularly during the assembly process.

Figure 28:
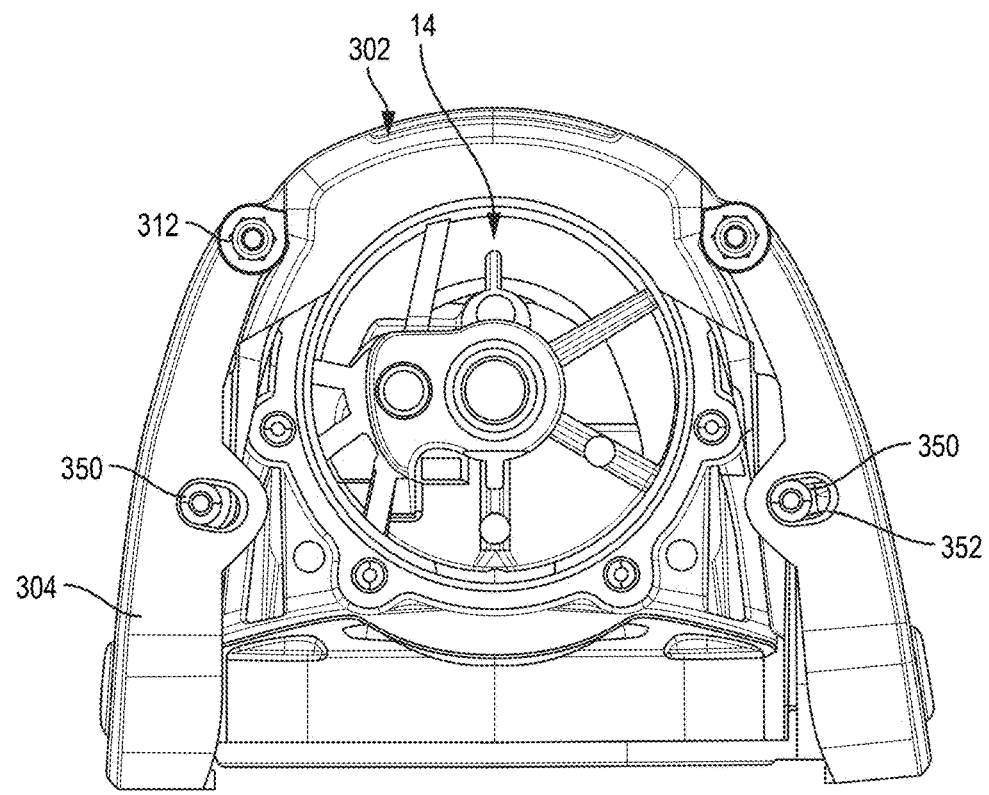
FIG. 28 depicts a bottom view of the grip accessory, according to an embodiment and the gear case, according to an embodiment.

FIG. 28 depicts a bottom view of the grip accessory 300, according to an embodiment and the gear case 14, according to an embodiment. As shown here, in an embodiment, the grip accessory 300 includes two downwardly-projecting posts 350 received within openings 352 of the triggers 304. Each opening 352 is positioned through a lateral portion of the trigger 304 and includes a lateral length that is greater than the diameter of the post 350. This allows the post to traverse within the opening 352 as the trigger 304 is moved from a released position (e.g., right trigger) to a depressed position (e.g., left trigger), while limiting the boundaries of the travel distance of the trigger 304.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

The invention claimed is:

1. An accessory for a power tool including a housing and a gear case, wherein the gear case includes at least one gear and a gear case cover that houses the at least one gear, the accessory comprising:
   a cover removably mountable to an outer surface of the gear case of cover and extending around at least an upper portion and at least a side portion of the outer surface of the gear case cover; and
   a trigger assembly pivotably secured to the cover and configured to selectively engage and activate a switch of the gear case.

2. The accessory of claim 1, wherein the cover comprises a post and the trigger includes an opening configured to cooperate with the post to limit a travel distance of the trigger relative to the cover.

3. The accessory of claim 1, wherein the trigger assembly comprises a trigger and an idler arm extending from a pivoting structure of the cover, the trigger is actuatable by a palm of an operator, and the idler arm is pivotably moveable in and out of engagement with the switch.

4. The accessory of claim 3, wherein the trigger assembly comprises a spring disposed between the trigger and the cover to bias the trigger away from the switch.

5. The accessory of claim 3, wherein the trigger assembly comprises a spring disposed between the idler arm and the trigger to bias the idler arm towards the switch.

6. The accessory of claim 1, further comprising a second trigger assembly pivotably secured to the cover and configured to engage and activate a second switch of the gear case, wherein the switch and the second switch are disposed on opposite sides of the gear case, and the trigger assembly and the second trigger assembly are disposed on opposite sides of the cover.

7. The accessory of claim 6, wherein an activation of either the trigger assembly or the second trigger assembly is required for the power tool to be activated.

8. An accessory for a power tool comprising:
   a mount member being removably mountable to a gear case of the power tool; and
   a trigger pivotably secured to the mount member and configured to selectively engage and activate a switch of the gear case, the trigger in a mounted position is actuatable by a palm of an operator of the power tool around a pivot member between a depressed position, where the trigger extends from the pivot member along a side surface of the gear case towards a front end of the gear case, and an undepressed position, where the trigger extends from the pivot member at an acute angle relative to the gear case.

9. The accessory of claim 8, wherein the power tool includes a threaded opening on a side of the gear case, and the mount member includes an opening configured to receive a fastener secured to the threaded opening.

10. The accessory of claim 8, further comprising a pin projecting from the trigger in the direction of the gear case, wherein the power tool includes an opening on a side of the gear case in which the switch is located, and the pin is configured to selectively contact the switch when the trigger is pressed.

11. The accessory of claim 10, wherein the mount member includes an opening through which the pin is received, further comprising a spring arranged to bias the pin away from the mount member in the direction of the trigger.

* * * * *